United States Patent [19]

Miyazawa

[11] Patent Number: 5,610,488
[45] Date of Patent: Mar. 11, 1997

[54] MICRO ROBOT

[75] Inventor: Osamu Miyazawa, Nagano-ken, Japan

[73] Assignee: Seiko Epson Corporation, Tokyo, Japan

[21] Appl. No.: 568,993

[22] Filed: Dec. 7, 1995

Related U.S. Application Data

[62] Division of Ser. No. 70,399, filed as PCT/JP92/01415 Nov. 2, 1992, Pat. No. 5,554,914.

[30] Foreign Application Priority Data

| Nov. 5, 1991 | [JP] | Japan | 3-288764 |
| Mar. 27, 1992 | [JP] | Japan | 4-71696 |
| Mar. 27, 1992 | [JP] | Japan | 4-71697 |
| Mar. 27, 1992 | [JP] | Japan | 4-71698 |

[51] Int. Cl.$^6$ ............................................. H02J 17/00
[52] U.S. Cl. ...................... 318/568.11; 318/587; 318/16; 318/568.12
[58] Field of Search ........................ 318/560–690; 15/319, 320; 180/169, 167; 901/1; 364/424.01, 424.02, 424.06, 424.08; 428/779; 623/64, 66; 128/20, 4; 604/95, 97

[56] References Cited

U.S. PATENT DOCUMENTS

| 3,621,911 | 11/1971 | Baker | 166/336 |
| 4,777,416 | 10/1988 | George, II et al. | 318/568 |
| 4,790,402 | 12/1988 | Field et al. | 180/169 |
| 4,846,297 | 7/1989 | Field et al. | 180/169 |
| 5,201,325 | 4/1993 | McEwen et al. | 428/779 |
| 5,293,955 | 3/1994 | Lee | 180/169 |
| 5,297,917 | 3/1994 | Freneix | 414/786 |
| 5,301,096 | 4/1994 | Klontz et al. | 363/37 |
| 5,304,899 | 4/1994 | Sasaki et al. | 318/16 |
| 5,337,732 | 8/1994 | Grundfest et al. | 128/4 |
| 5,369,347 | 11/1994 | Yoo | 318/568.12 |
| 5,377,106 | 12/1994 | Drunk et al. | 364/424.02 |

Primary Examiner—Paul Ip
Attorney, Agent, or Firm—Ladas & Parry

[57] ABSTRACT

A micro robot having a size of about 1 cm$^3$ and capable of wireless control. This robot includes at least two sensors (12, 14) having detection regions thereof overlapping partially with each other, at least a pair of independently operated driving units (30, 28) having driving points spaced apart in a direction perpendicular to a moving direction, control units (40, 58, 60, 62) for controlling the driving units on the basis of the outputs of the sensors, and a rechargeable power supply portion (16) for supplying a power supply voltage to the sensors, the driving units and the control units. The control units and the power supply units are disposed between the driving units.

13 Claims, 41 Drawing Sheets

FIG. 15A 16 Hz 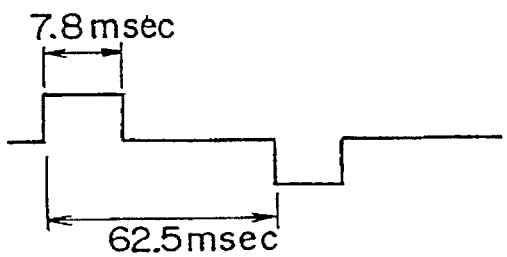
FIG. 15B 32 Hz
FIG. 15C 64 Hz 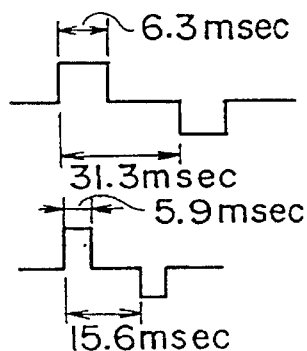
FIG. 15D 128 Hz 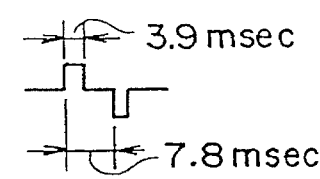
FIG. 16
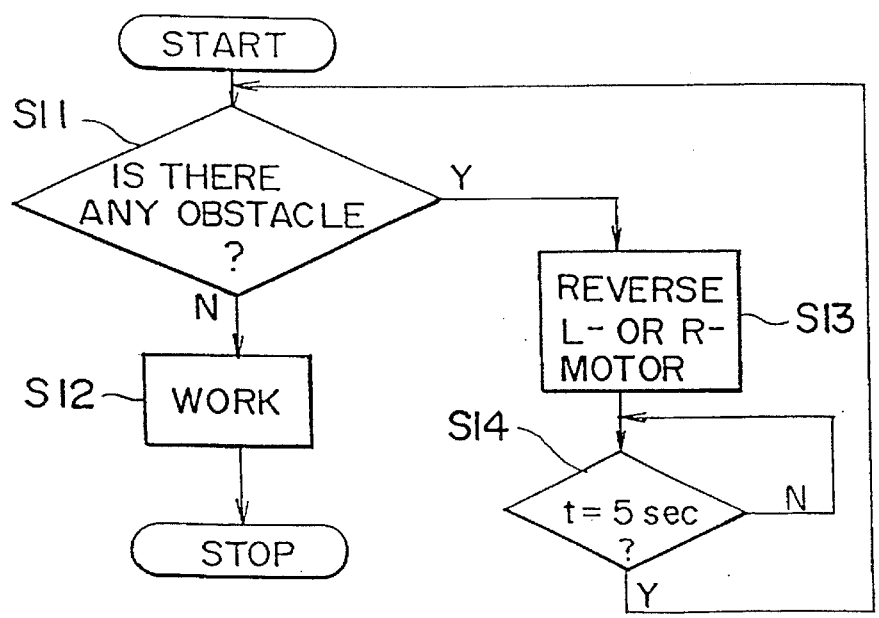

CHANGE WITH THE PASSAGE OF 5 sec

FIG. 19
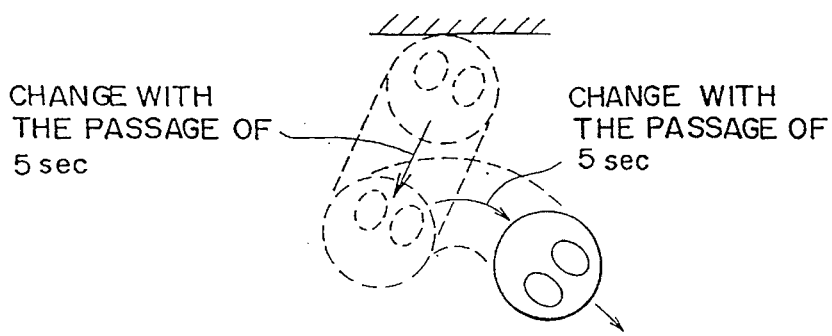
FIG. 20A ELECTRIC SOURCE WAVEFORM UPON ROTATION
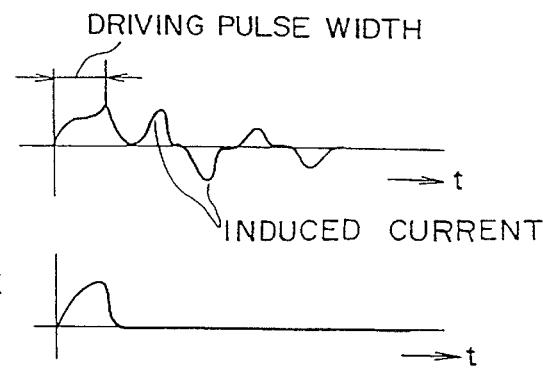
FIG. 20B ELECTRIC SOURCE WAVEFORM UPON NOT-ROTATION F I G. 33
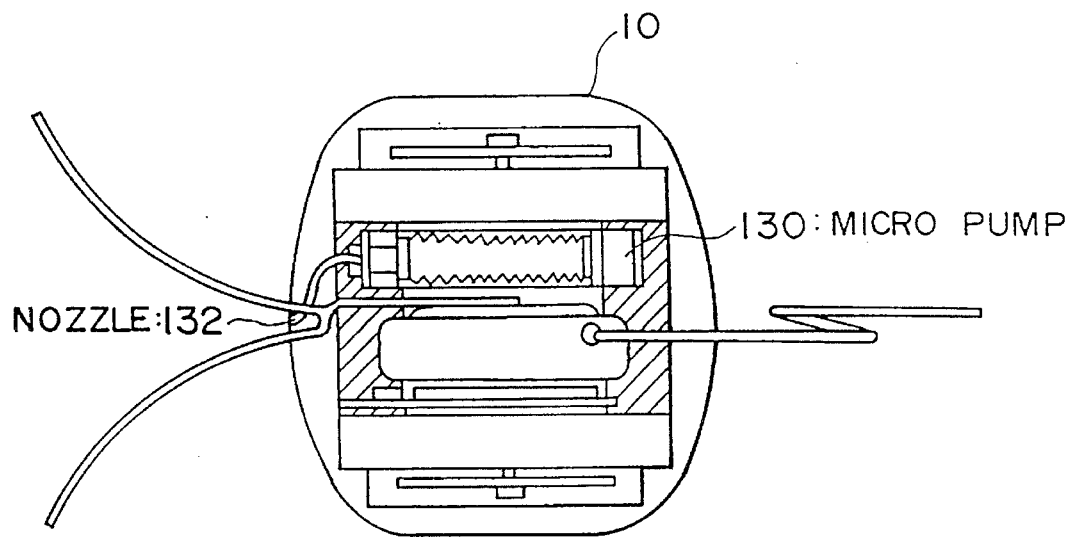
F I G. 34
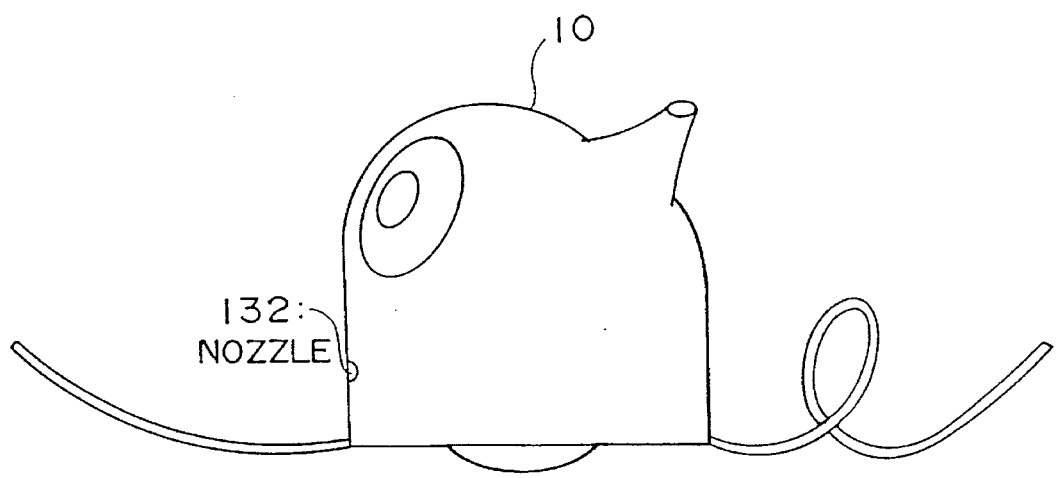

F I G. 35
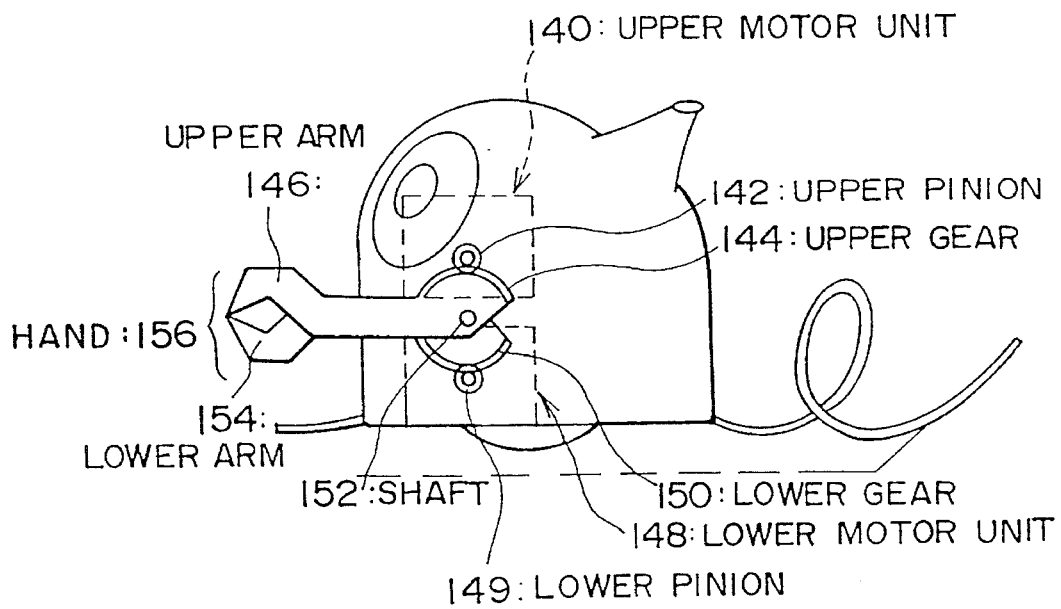
F I G. 36
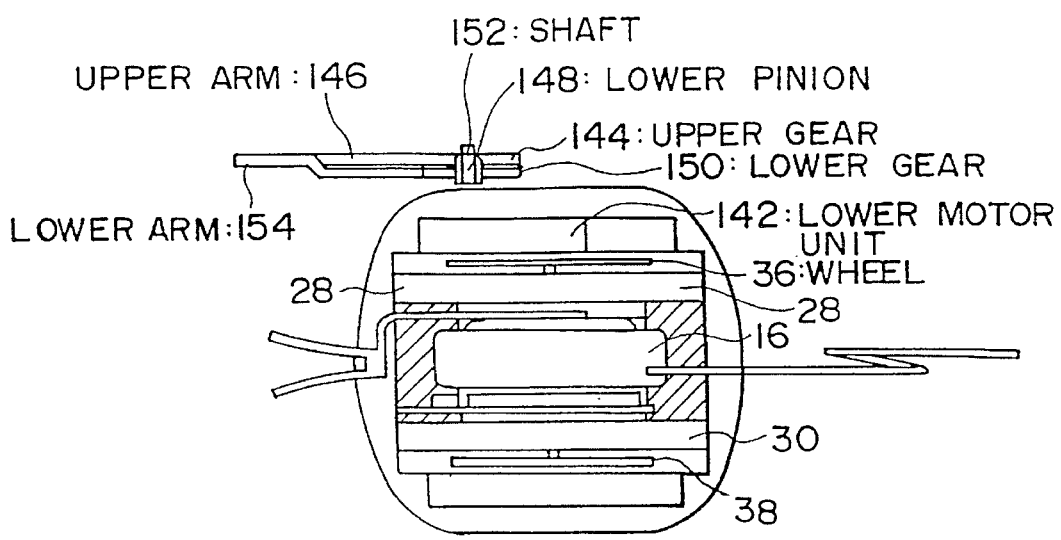

F I G. 39
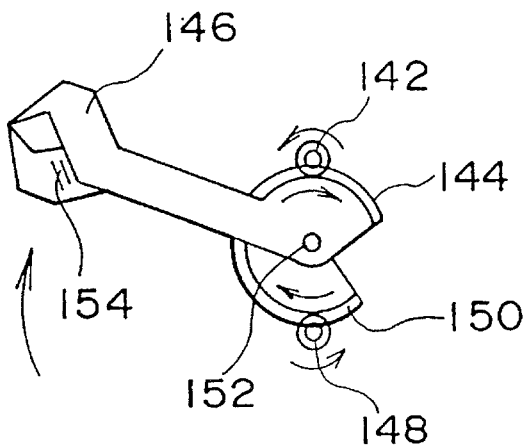
F I G. 40
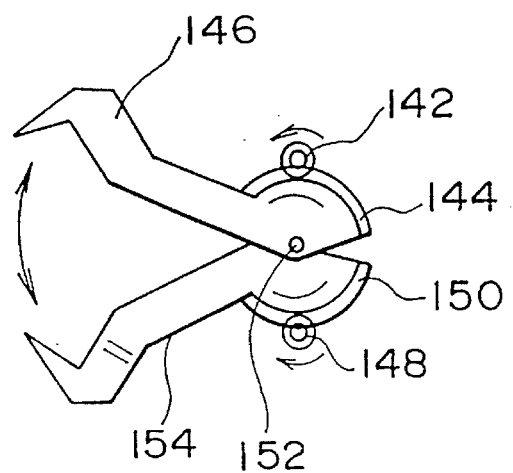

MICRO ROBOT

This is a divisional of application Ser. No. 08/070,399 filed on Jun. 7, 1993, now U.S. Pat. No. 5,554,914, which is a 371 of International Application PCT/JP92/01415 filed on Nov. 2, 1992 and which designated the U.S.

TECHNICAL FIELD

The present invention relates relates to a micro robot which has a very small size of, for example, about one cubic centimeter and which can be controlled in a wireless manner.

BACKGROUND TECHNIQUE

In the case of controlling a robot in a wireless manner, conventionally, control called radio control was carried out and a control system using an electric wave was used. In order to perform direction control, steering was made in accordance with a control signal superimposed on an electric wave. Further, in order to make a robot autonomously proceed in a desired direction, a directional antenna was used or a visual sensor or the like was used together. Wheels were used in a running portion to thereby reduce running resistance. Further, terminals for changing were constituted by rigid contacts and formed in an recess portion of a body.

However, such a robot control system as mentioned above is not suitable for minimization because numbers of electric elements were required in a transmission side as well as in a reception side because of using an electric wave, and a steering mechanism was further required. Further, in order to constitute the system adapted to make a robot autonomously move toward a direction from which an electric wave was transmitted, it was necessary to additionally provide such an antenna or sensor as mentioned above, and the control system was therefore not suitable for minimization also in this point. Furthermore, in the case where part other than a driving portion was supported by wheels, the robot could not go over a large uneven portion when the wheels were small, while minimization was difficult when the wheels were large. The charging terminals could not be made small in view of handling, and they were an obstacle to minimization.

Further, even if it was intended to make such a robot operate any work, the situation were such that there is no any mechanism suitable therefor.

Further, it was impossible to mount a battery of a large capacity because of a demand for minimization, and although it was desirable to perform contactlessly charging in view of wireless control, the situation was that such a charging mechanism was not yet developed.

DISCLOSURE OF INVENTION

It is an object of the present invention to provide a micro robot having a size of about one cubic centimeter.

It is another object of the present invention to provide a micro robot in which a work mechanism is provided in a robot body having a size of about one cubic centimeter.

It is a further object of the present invention to provide a micro robot which has a size of about one cubic centimeter and which is chargeable contactlessly.

According to an aspect of the present invention, a micro robot comprises: at least two sensors having respective detection regions partly overlapping each other; at least one pair of driving means being driven-independently of each other and having driven points separated from each other in the direction perpendicular to a direction of movement; a control portion for controlling the driving means on the basis of outputs of the sensors; and a chargeable power source portion for supplying a power source voltage to the sensors, the driving means and the control portion, the control portion and the power source portion being arranged between the driving means. By such a configuration, it is made possible to achieve minimization. Particularly by the fact that the respective detection regions of the sensors are overlapped each other, it is possible to obtain a function that the robot can be moved autonomously toward a target by means of a simple circuit. Further, since the driving means are controlled independently of each other, complicated operation can be controlled by means of a simple mechanism. Furthermore, since the control portion and the power source portion are arranged between the pair of driving means, the robot body can be minimized.

According to another aspect of the present invention, the micro robot is supported by three points including the two driven points which are driven relative to a running ground by the pair of driving means, and one sliding point which slidably contacts with the running ground. Accordingly, balanced and stable running can be carried out.

According to a further aspect of the present invention, in the micro robot, a line segment connecting the two driven points interlinks with the direction of gravity of the micro robot at its center of gravity depending on inclination of the running ground, and the position of the sliding point varies between the front and back of the interlinkage. The sliding point varies depending on the positional relation between the line segment connecting the driven points and the center of gravity, and on an upward slope, therefore, the center of gravity of the robot takes a position upper than the driven points so that the frictional force becomes large to thereby improve the climbing force.

According to a still further aspect of the present invention, the micro robot further comprises a flexible protrusion which projects from a body and which is conductive with the power source portion. Not only the protrusion portion functions as a sliding portion so that the running resistance is reduced to improve the running property as well as the property of running covering the whole distance, but also the protrusion portion is made to be electrically conductive with the power source portion so as to function as a charging terminal so that the charging work has become easy and such a risk of damaging the power source portion due to concentration of stress has been prevented from occurring.

According to anther aspect of the present invention, in the micro robot, each of the driving means includes a motor constituted by a stepping motor, so that the quantity of movement can be programmed with the number of steps.

According to a further aspect of the present invention, in the micro robot, the control portion carries out accelerating control on the driving means at the time of starting driving of the driving means, and wherein the control portion makes the driving condition of one of the driving means coincide with that of the other driving means when the driving of the one driving means is started while the other driving means is being driven. Thus, the mode of movement can smoothly shifted from turning movement to straight movement.

According to a still further aspect of the present invention, the micro robot further comprises an obstacle sensor for detecting an obstacle so that when the obstacle sensor detects an obstacle the control portion reversely drives at least one of the driving means for a predetermined period of time and then returns the at least one driving means to its normal operation. Thus, it is possible to make the micro robot automatically move in the direction to go away far from the obstacle.

According to another aspect of the present invention, in the micro robot, the control portion detects presence or absence of rotation of a motor included in each of the driving means on the basis of an induced voltage in a winding of the motor. For example, if the fact that the motor is not rotating is detected, all the motors are driven to reversely rotate for a predetermined period of time, the motor which was detected so that it did not rotate is then drive for a predetermined period of time, and thereafter the normal operation is carried out so that the micro robot can be made to automatically move in the direction away far from the obstacle.

According to a further aspect of the present invention, in the micro robot, the control portion drives the driving means while accelerating, and wherein the control portion performs driving with driving pulses the width of which is widened at the time of starting while narrowed at the time of high speed. Accordingly, large driving force can be obtained, and the energy efficiency is so improved that the consumption of the power source portion is reduced.

According to a still further aspect of the present invention, in the micro robot, the control portion makes the respective timings of supplying driving pulses to the driving means coincident with each other. In this case the property of straight running is improved.

According to another aspect of the present invention, the micro robot further comprises at least two screws driven by the driving means, and wherein the control portion makes the respective timings of supplying driving pulses to the driving means shift from each other. The respective timings of sending out driving pulses are shifted so that the rapid consumption of the power source is prevented from occurring.

According to a further aspect of the present invention, a micro robot comprises: at least two direction control sensors having respective detection regions partly overlapping each other; at least one pair of driving means being driven independently of each other and having driven points separated from each other in the direction perpendicular to a direction of movement; a work control sensor which receives a work instruction contactlessly from an operation side; a work driving means; and a control portion for controlling the driving means on the basis of outputs of the direction control sensors and for controlling the work driving means on the basis of an output of the work control sensor. The traveling direction is automatically controlled on the basis of an output of the direction control sensor, and after the robot has been moved to a desired position, an instruction is given from the operation side to the work control sensor to thereby drive the work driving means so that a desired work is carried out.

According to a still further aspect of the present invention, a micro robot comprises; a reception sensor for contactlessly receiving an external instruction; at least one pair of driving means being driven independently of each other and having driven points separated from each other in the direction perpendicular to a direction of movement; a work driving means; and a control portion for driving the driving means and for controlling the work driving means, on the basis of an output of the reception sensor. This micro robot is provided with no direction control sensor but the function of the direction control sensor is given to the reception sensor. Accordingly, the traveling direction can be controlled and work can be carried out on the basis of an external instruction through the reception sensor.

According to another aspect of the present invention, the micro robot further comprises a signal transmission element for externally and contactlessly transmitting a signal and a detection element; and wherein the control means causes the signal transmission element to transmit information detected by the detection element. Thus, the situation of the robot is informed to the outside.

According to a further aspect of the present invention, in the micro robot, the work driving means includes a micro pump which is driven to discharge a fluid bit by bit.

According to a still further aspect of the present invention, in the micro robot, the work driving means includes a hand mechanism and a driving means for driving the hand mechanism. By this hand mechanism, it is made possible to carry out handling such as conveying parts or the like.

According to another aspect of the present invention, a micro robot is attached to an end portion of an endoscope, and comprises: a photovoltaic element for receiving light through optical fibers and for supplying a power source voltage; a micro pump for discharging a fluid; and a control portion for analyzing a control signal superimposed on the light obtained through the optical fibers to thereby drive the micro pump. By means of the endoscope, it is possible that while the inside of body is being inspecting, the micro pump is driven at a desired position to thereby discharge, for example, a medical fluid.

According to a further aspect of the present invention, a micro robot comprises: a robot body provided with a built-in motor and disposed within a non-magnetic pipe containing a fluid therein; and an exciting device provided at the outside of the non-magnetic pipe and for supplying a stator of the motor with magnetic flux corresponding to the number of poles of the motor. Thus, driving energy can be supplied contactlessly from the outside and the driving of the motors can be controlled.

According to a still further aspect of the present invention, in the micro robot, the exciting device is supported so as to be movable in the direction of length of the non-magnetic pipe. With the movement of the excitation device, the robot body moves so that the position control of the robot body can be carried out.

According to another aspect of the present invention, a micro robot comprises: at least two sensors having respective detection regions partly overlapping each other; at least one pair of driving means being driven independently of each other and having driven points separated from each other in the direction perpendicular to a direction of movement; a control portion for controlling the driving means on the basis of outputs of the sensors; and a contactlessly chargeable power source portion for supplying a power source voltage to the sensors, the driving means and the control portion. Since the detection regions are overlapped each other, a function of autonomous movement toward a target can be realized with a simple circuit. Further, since the driving means are controlled independently of each other, complicated operation can be controlled by means of a simple mechanism to thereby make it possible to minimize the micro robot body. Further, since the power source portion is made chargeable contactlessly, perfect wireless control can be made.

According to a further aspect of the present invention, in the micro robot, each of the driving means includes a built-in motor so that an induced voltage is generated in a winding of the motor by a magnetic field of an externally provided charging coil, the induced voltage being used after rectified to charge the power source. The micro robot further comprises a mechanism by which the micro robot automatically moves toward a stand in which the charging coil is provided. Accordingly, if the voltage of the power source portion becomes low, the robot moves automatically toward the charging stand so that the power source portion is automatically charged.

According to a still further aspect of the present invention, in the micro robot, a photovoltaic element or a thermoelectric generation element is connected to the power source portion so that the photovoltaic element or the thermoelectric generation element generates electricity in response to light or in response to heat absorption/generation of an externally provided heat absorption/generation body to thereby charge the power source portion. Thus, the power source portion is charged automatically.

Further, a booster circuit is connected to the power source portion so that the booster circuit performs automatic boosting operation in accordance with a voltage of the power source portion. Thus, the circuit can be made to operate normally even if the voltage of the power source portion becomes low.

According to another aspect of the present invention, a micro robot comprises: a driving means having a built-in motor for driving a fin to rotate; an arm adapted to open outward so as to engage with a pipe inner wall; a contactlessly chargeable power source portion for supplying a power source voltage to the sensor, the driving means and the control portion; and a control portion which stops the driving of the motor and opens the arm so as to stop within a fluid, when the voltage of the power source portion becomes a value not higher than a predetermined reference voltage value. When the fin is rotated by a flow of the fluid during stoppage, an induced voltage is generated in a winding of the motor so that the power source portion is charged by the induced voltage after rectified. Accordingly, the charging can be made automatically inside a fluid.

BRIEF DESCRIPTION OF THE DRAWINGS

FIGS. 15A–15D illustrate a waveform diagram of the driving pulses of the robot of the embodiment of FIG. 5.

FIG. 16 is a flowchart showing the processing (No. 1) in the case of avoiding an obstacle.

FIG. 19 is an explanatory view of the above avoiding operation.

FIGS. 20A and 20B illustrate a timing chart showing a method of detecting presence or absence of the rotation of the stepping motor.

FIG. 33 is a bottom view of a further embodiment of the micro robot according to the present invention.

FIG. 34 is a side view of the micro robot of FIG. 33.

FIG. 35 is a side view of another embodiment of the micro robot according to the present invention.

FIG. 36 is a bottom view of the micro robot of FIG. 35.

FIG. 39 is a view showing the state in which the micro robot of FIG. 35 has raised its hand.

FIG. 40 is a view showing the state in which the micro robot of FIG. 35 has opened its hand.

THE BEST MODE FOR CARRYING OUT THE INVENTION

Figure 1:
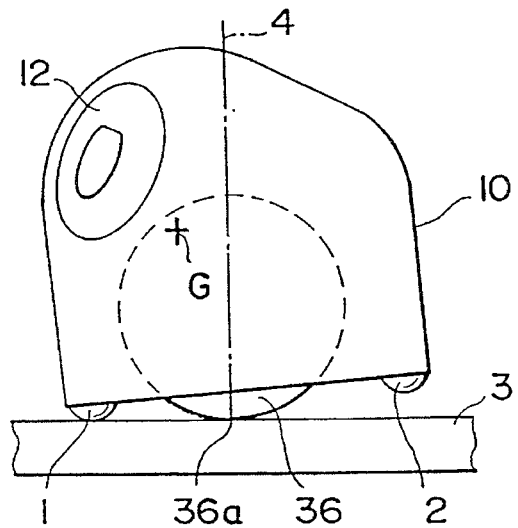
FIG. 1 is a side view of an embodiment of the micro robot according to the present invention.
Figure 2:
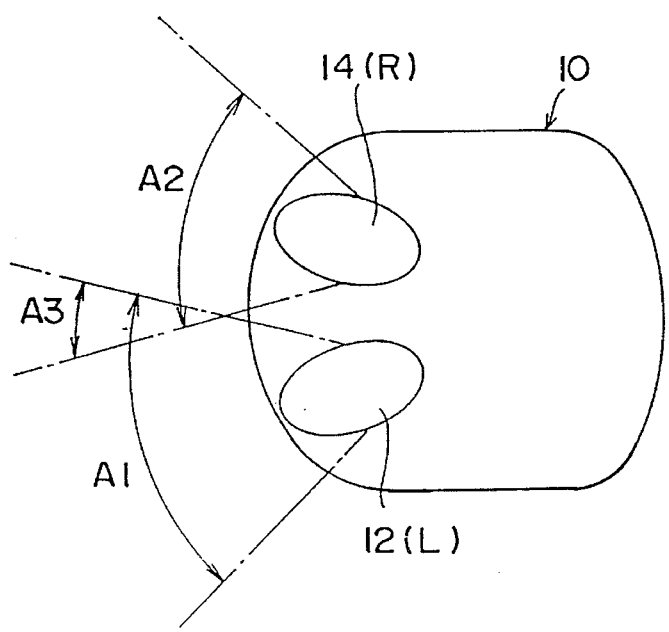
FIG. 2 is a top view of FIG. 1.

FIG. 1 is a side view showing a micro robot according to an embodiment of the present invention, and FIG. 2 is a top plan view thereof. A pair of sensors 12 and 14 are provided at front portions of a robot body 10 as shown in the drawings. Although a light sensor constituted, for example, by a photodiode, a phototransistor, or the like, an ultrasonic sensor for converting an acoustic wave into a voltage with a piezo-electric element, or the like is used as each of the sensors 12 and 14, a phototransistor is used in this embodiment. The sensors 12 and 14 have fields of view A1 and A2 as their detection regions respectively. Since the fields of view A1 and A2 overlap each other at the center portion, the sensors 12 and 14 have an overlapped field of view A3. Therefore, when light from a light source exists in front, that is, in the field of view A3, the sensors 12 and 14 detect the light. Being disposed in a left side portion of the robot body 10, the sensor 12 is stated as an L-sensor in a flowchart of the drawing which will be described later. Similarly to this, being disposed in a right side portion in the robot body 10, the sensor 14 is stated as an R-sensor.

Figure 3:
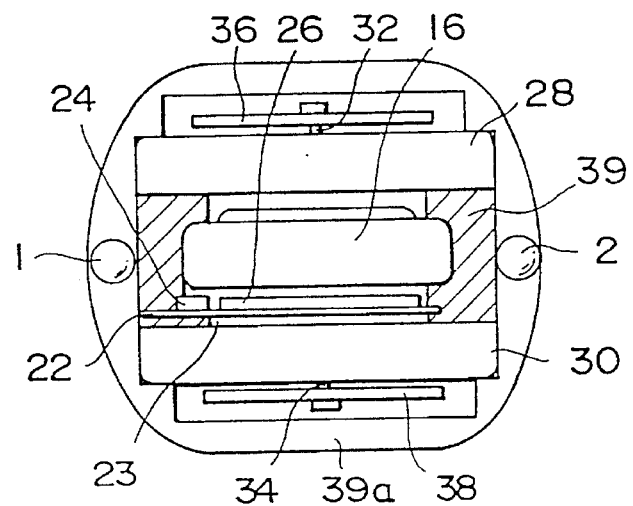
FIG. 3 is a bottom view of FIG. 1.

FIG. 3 is a bottom plan view of FIG. 1. A light source portion 16 configured as a thin plate, is located at a central portion and is constituted, for example, by an electric double layer capacitor, a Ni—Cd battery, and the like. A circuit portion 22 configured as a thin plate is provided in the close vicinity of the power source portion 16. The circuit portion 22 includes a CMOS-IC 24, a pull-down chip resistor 26, and the like, mounted on a circuit substrate 23, the detail thereof being described later. Respective driving portions 28 and 30, each configured as a thin plate, are provided therein with stepping motors and reduction gear mechanisms, and controlled by the circuit portion 22 so as to drive wheels 36 and 38 fitted onto output shafts 32 and 34 to rotate through the stepping motors and the reduction gear mechanisms. Rubber is attached onto an outer circumference of each of the wheels 36 and 38. Further, the shape of each of the wheels 36 and 38 is not limited to a circle but each of the wheels 36 and 38 may be formed into any one of various shapes such as a triangle, a square, and the like in accordance with the use.

A spacer 39 supports the power source portion 16, the circuit portion 22, and the driving portions 28 and 30 on a housing 39a. The power source portion 16 and the circuit portion 22 are provided in parallel between the pair of driving portions 28 and 30 so that they overlap each other. Consequently, the power source portion 16 and the circuit portion 22 can occupy wide areas considering the whole volume. Therefore, a large current can be efficiently derived because the internal resistance of the capacitor and secondary battery can be made low in the power source portion 16, and the circuit portion 22 is advantageous in mounting of a large-sized IC chip having a complicated function. Further, since the driving portions 28 and 30 are provided separately of each other, any magnetic interference or the like is not generated therebetween.

Sliding portions 1 and 2 are provided on the bottom portion of the micro robot body 10 so that one of the sliding portions is in contact with a running ground 3. In the embodiment of FIG. 1, the center of gravity G of the micro robot body 10 is located below the height of the driving means 36 and sensors 12 and 14, and, at a portion slightly lefthand in the drawing (hereinafter, referred to "forward") relative to the vertical direction 4 of a driving point 36a where the wheel 36 contacts with the running ground 3 and therefore the sliding portion 1 contacts with the running ground.

Figure 4:
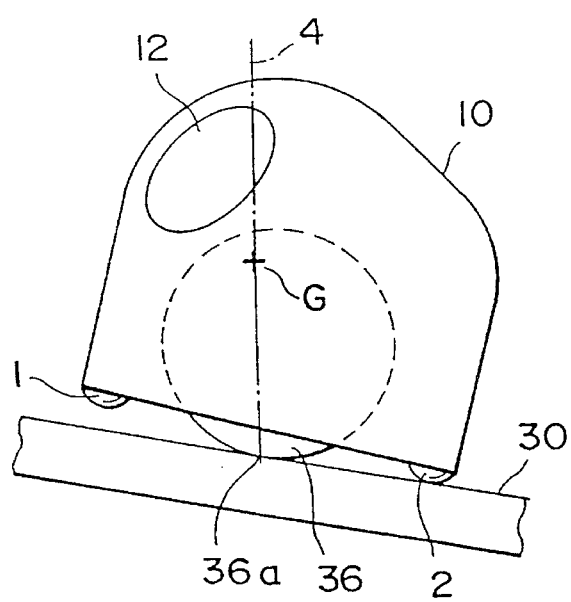
FIG. 4 is an explanatory view in the case where the robot body goes up on the inclined running ground.

FIG. 4 is an explanatory diagram showing a case where the running grounded 3 is inclined and the robot body 10 climbs the slope. Here, it is assumed that the climbing ability of the driving portions is approximate to the limit. In such a situation, the center of gravity G is located at a portion righthand in the drawing (hereinafter, referred to as "backward") relative to the vertical direction 3 and therefore the sliding portion 2 contacts with the running ground 3. In this case, in order to improve the climbing ability, it is necessary that not only the torque of the driving portions is increased but the frictional resistance of the sliding portion is decreased and the frictional force of the driving point 36a is increased. That is, in climbing requiring a high driving force, it is preferable that the center of gravity is located so that the whole weight is applied onto the driving point 36a in the state where such a force that a front portion of the micro robot body 10 will be lifted up by reaction of the driving force of the driving portions and a force due to the relation between the center of gravity and the vertical direction are added to each other. In other words, it is preferable that the configuration is made such that the center of gravity G is located in the front of the vertical direction when the running ground is a horizontal path or a downward slope and, on the contrary, the center of gravity G is located in the rear of the vertical direction in the vicinity of the limit of the climbing ability, that is, it is preferable that the center of gravity G is in positional relation with respect to the vertical direction 4 of the driving point in accordance with the running ground 3.

Figure 5:
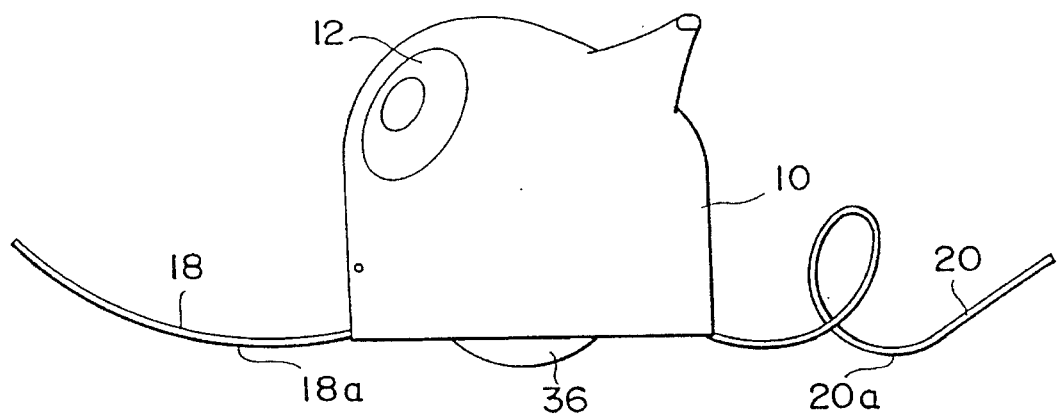
FIG. 5 is a side view of another embodiment of the micro robot according to the present invention.
Figure 6:
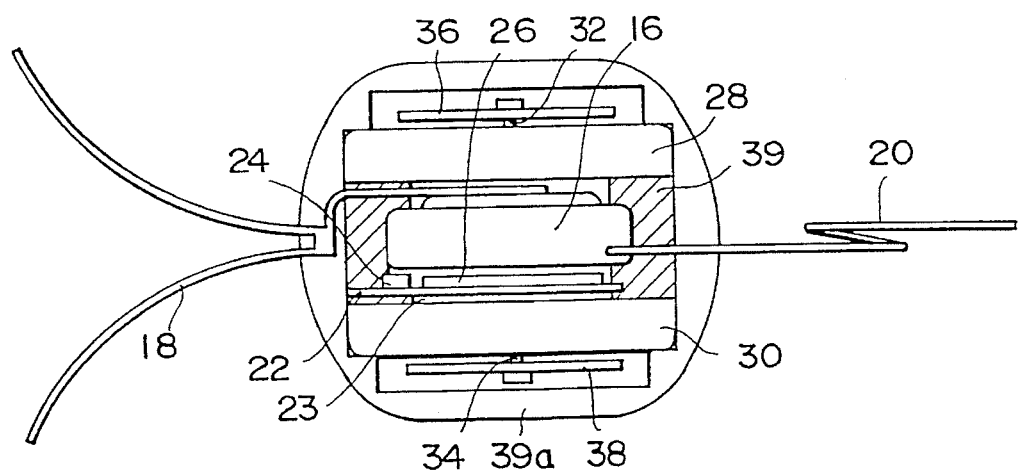
FIG. 6 is a bottom view of FIG. 5.

FIGS. 5 and 6 are a side view and a bottom plan view respectively, showing a robot body according to another embodiment of the present invention. In this embodiment, a tactual sense portion 18 and a tail 20 are provided for the purpose of charging and balancer.

Although respective sliding portions 18a and 20a are provided in the tactual sense portion 18 and the tail 20 so as to have the same functions as those of the foregoing sliding portions 1 and 2, the sliding portions 18a and 20a contact with a running ground 3 in the outside of a robot body 10. Consequently, since a force acting on the sliding portions 18a and 18a is small so that the frictional resistance is small and a running loss is therefore less. Bending portions 18b and 20b are provided in the tactual sense portion 18 and the tail 20 at their end portions respectively, the bending portions 18b and 20b being smoothly curved relative to the running ground. In such a configuration, the robot body can easily run while sliding even if the running ground is considerably uneven.

The tactual sense portion 18 and the tail 20 have not only flexibility but electrical conductivity, and one of them is connected to a power source portion 16 constituted by an electric double layer capacitor, a secondary battery, and the like. In such a configuration, not only treatment can be easily performed because the power source portion 16 can be charged through a projection portion of the tactual sense portion 18 or the tail 20 but no stress concentrates to thereby hardly cause destruction because of the flexibility thereof.

Figure 7:
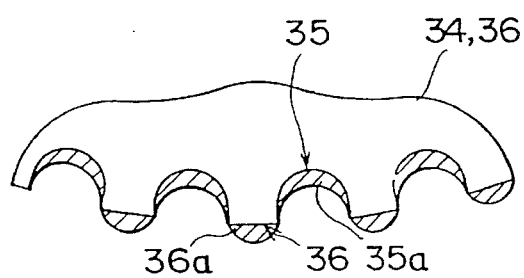
FIG. 7 is an enlarged side view of a wheel of the above-mentioned micro robot.

FIG. 7 is a partially enlarged view showing the side surface of each of wheels 34 and 36 of the micro robot according to the present invention. Concave and Convex portions 35 and 37 are provided in an outer peripheral portion and high frictional agents 35a and 37a such as rubber, plastic materials, or the like, are stuck. In such a configuration, if each of the high frictional agents 35a and 37a is in a fluid phase a curing property, the agents are cured into illustrated shapes by surface tension so that only the portions of the high frictional agents 37a contact with the running ground. Consequently, the load of the micro robot concentrates so that the high frictional agents 37a are apt to elastically change so as to obtain large frictional resistance to thereby improve the climbing ability. Further, the shapes of the concave and convex portions are not limited to those in this embodiment, but it will do to attach high frictional agents onto contacting portions in the same manner as in the foregoing case even in the case where arms or the like are used in place of the wheels.

Figure 8:
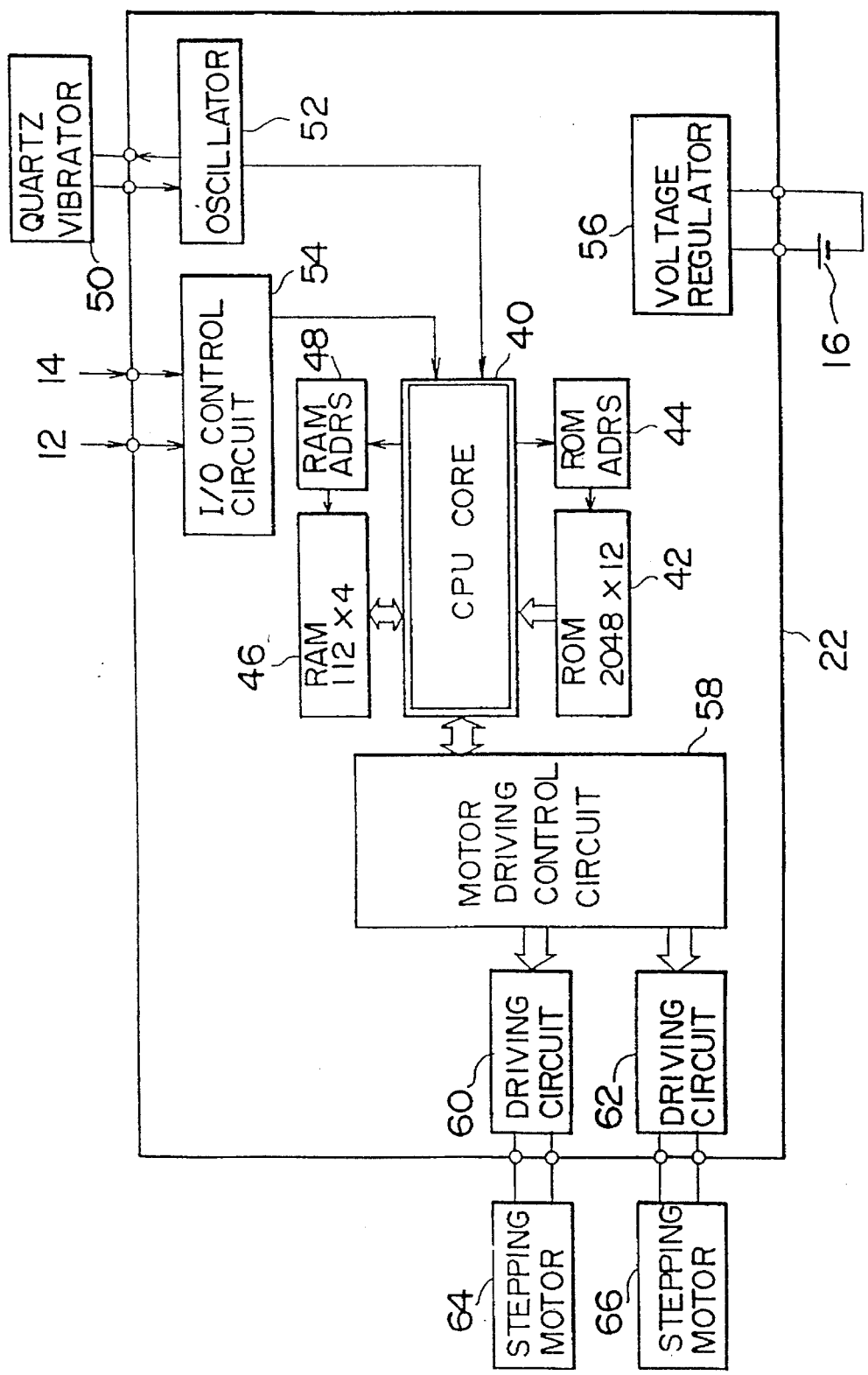
FIG. 8 is a block diagram showing in detail the circuit portion.

FIG. 8 is a block diagram showing the circuit portion 22 in detail. A CPU core 40 constituted by an ALU, various registers, and the like is connected to an ROM 42 carrying programs stored therein, an address decoder 44 for the ROM 42, an RAM 46 for storing various data, and an address decoder 48 for the RAM 46. A quartz vibrator 50 is connected to an oscillator 52 and an oscillation signal of the oscillator 52 is supplied to the CPU core 40 as a clock signal. Outputs of sensors 12 and 14 are inputted to an I/O control circuit 54 and outputted to the CPU core 40. A voltage regulator 56 is provided for stably supplying a circuit portion 22 with the voltage of a power source portion 16. A motor driving control circuit 58 performs delivery of the control signal between the motor driving control circuit 58 and the CPU core 40 so as to control stepping motors 64 and 66 through motor driving circuits 60 and 62 respectively. Power source voltages necessary for the foregoing various circuits and the like are supplied from the power source portion 16.

The stepping motor 64 is stated as an R-motor in a flowchart of the drawing which will be described later because the motor 64 is built in a driving portion 30 and disposed at a right side portion in the robot body 10, and, similarly to this, the stepping motor 66 is stated as an L-motor because the motor 66 is built in the driving portion 28 and disposed at the left side portion in the robot body 10.

Figure 9:
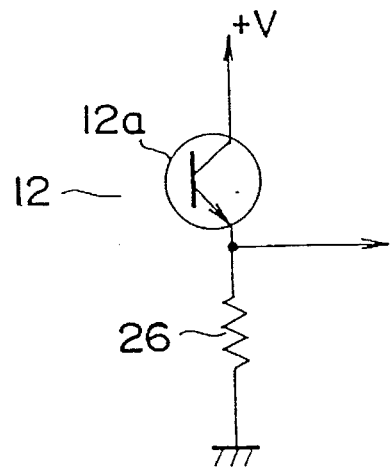
FIG. 9 is a circuit diagram of the sensor.

FIG. 9 is a circuit diagram of the sensor 12. The sensor 12 is constituted by a phototransistor 12a the emitter of which is connected in series to a pull-down resistor 26. A light detection output is taken out of the emitter of the phototransistor 12b, shaped in the I/O control circuit 54, and then supplied to the CPU core 40. Although the circuit diagram shows an example of the sensor 12, the sensor 14 has quite the same configuration as that of the sensor 12.

Figure 10:
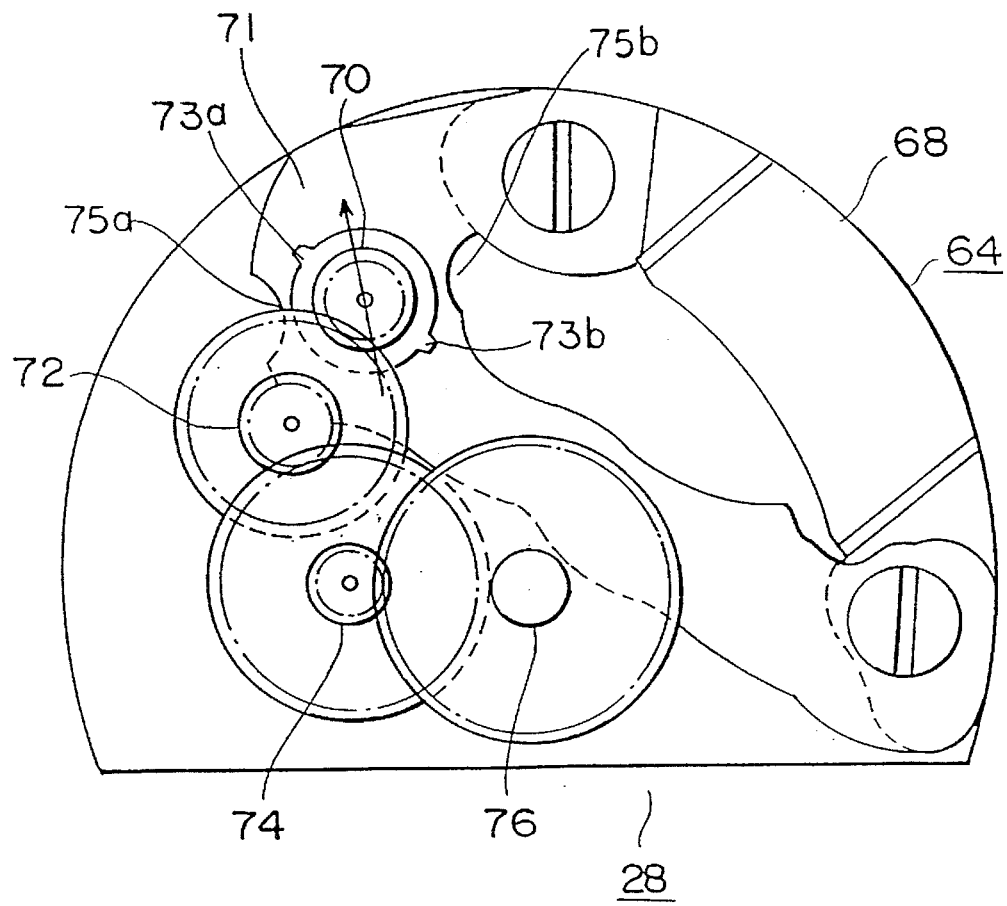
FIG. 10 is a plan view of the driving portion.
Figure 11:
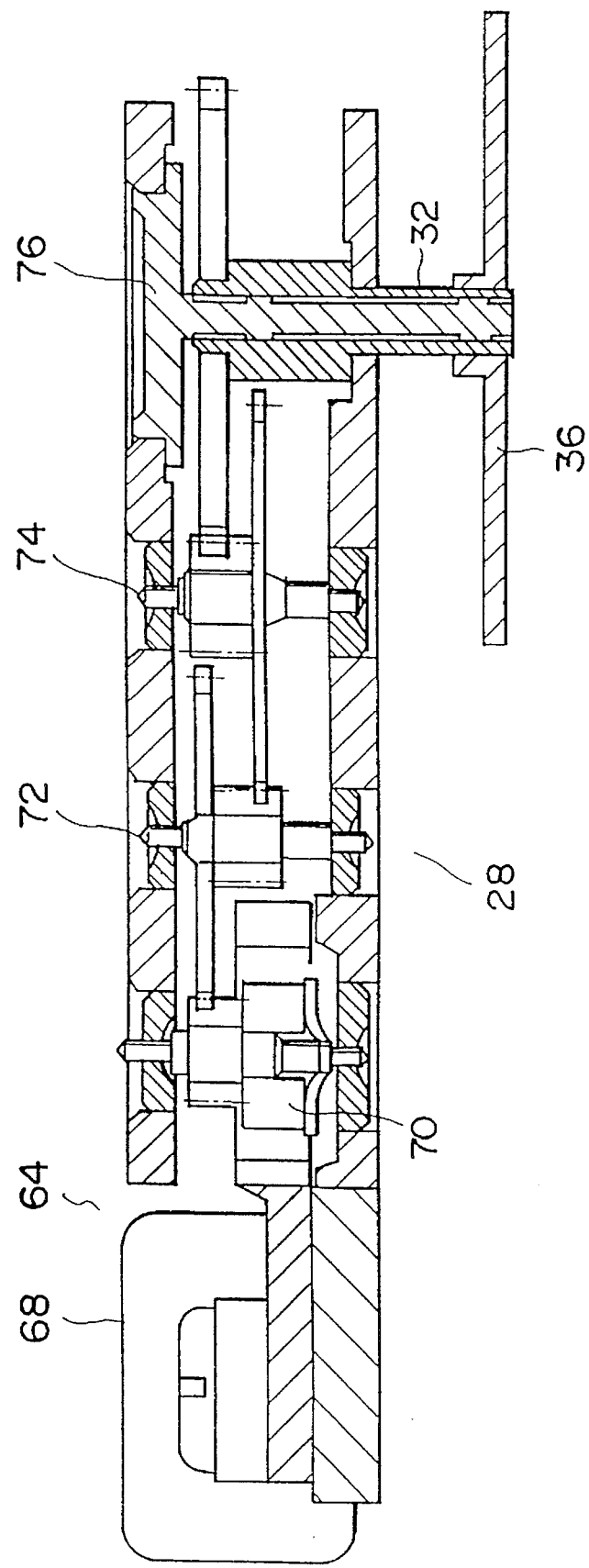
FIG. 11 is a development view of the driving portion of FIG. 10.
Figure 12:
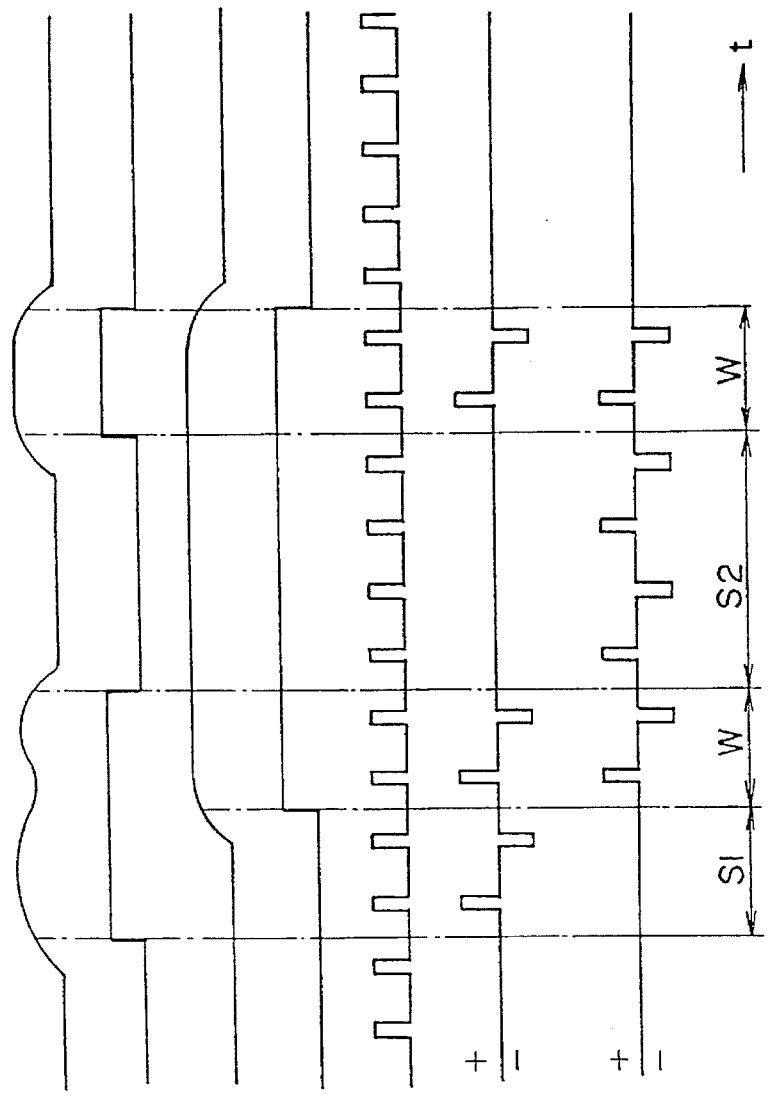
FIGS. 12A–12G illustrate a timing chart showing the basic operation of the robot of the embodiment of FIG. 1 or FIG. 5.

FIG. 10 is a plan view showing the driving portion 30, and FIG. 11 is a development thereof. The stepping motor 64 has an exciting coil 68 and a rotor 70 constituted by a magnet. The stator 71 has a pair of recesses 73a and 73b formed therein and a pair of concave portions 75a and 75b disposed outside of the hole which contains the rotor 70. An electromagnetic two-pole stepping motor used in an electronic clock is utilized in this embodiment. The rotor 70 drives a pinion 72, the pinion 72 drives a pinion 74 through a gear, the pinion 74 drives a pinion 76 through a gear, and the thus speed-reduced pinion 76 drives the wheel 38 to rotate. The mechanism of FIGS. 6 and 7 utilizes the mechanism of an electronic clock. Also the mechanism of a driving portion 28 is the same as that shown in FIGS. 6 and 7. Since the stepping motors 64 and 66 are arranged so as drive the wheels to rotate through speed reduction from high speed rotation as shown in FIGS. 6 and 7, the driving portions 30 and 28 can be minimized in size. Further, since the exciting coil 68 is provided far away from the rotor 70, the driving portions 30 and 28 can be decreased in thickness and size also in this point of view.

FIGS. 12A–12G illustrate a timing-chart showing an example of the fundamental operation of the robot according to the foregoing embodiments. When no light is incident into the sensors 12 and 14, the outputs thereof are zero V. When light is incident, however, the sensors output voltages corresponding to the quantity of light. The output voltages are waveform-shaped with a desired threshold voltage in the I/O control circuit 54 and then supplied to the CPU core 40 so that the motor driving control circuit 58 supplies forward and backward driving pulses alternately to the stepping motors 64 and 66 through the driving circuits 64 and 66 respectively. Consequently, in a period $S_1$ during which the sensor 12 is receiving light, the stepping motor 64 operates to drive the wheel 38 to rotate. In a period $S_2$ during which the sensor 14 is receiving light, the stepping motor 66 operates to drive the wheel 36 to rotate. In a period W during which both the sensors 12 and 14 are receiving light, both the stepping motors 64 and 66 operate to drive the wheels 38 and 36 to rotate respectively.

In the simplest driving example, therefore, when light from the light source exists in the field of view A1 (however, except the field of view A3), the light sensor 12 detects the light so that the stepping motor 64 drives the wheel 38 to rotate correspondingly to the light detection output. At this time, the wheel 36 is in the stopped state and therefore the whole robot body 10 moves to turn left. When light from the light source exists in the field of view A2 (however, except the field of view A3), on the contrary, the light sensor 14 detects the light so that the stepping motor 66 drives the wheel 36 to rotate correspondingly to the light detection output. At this time, the wheel 38 is in the stopped state and therefore the whole robot body moves to turn right. Further, when light from the light source exists in the field of view A3, the light sensors 12 and 14 detect the light so that the stepping motors 64 and 66 operate to drive the wheels 38 and 36 to rotate correspondingly to the light detection outputs respectively. As a result, the robot body 10 moves straight. The robot body 10 is controlled as described above so as to move toward the light source.

Further, the embodiment has shown one combination between the position of the sensors and the arrangement of the driving portions which move in the direction of the field of view, but the invention is not limited to this embodiment.

Although description has been made above as to the operation in the case where driving is performed at a predetermined speed when either of the light sensors 12 and 14 detects light, the driving force becomes high if driving is performed with acceleration at the time of starting drive.

Figure 13:
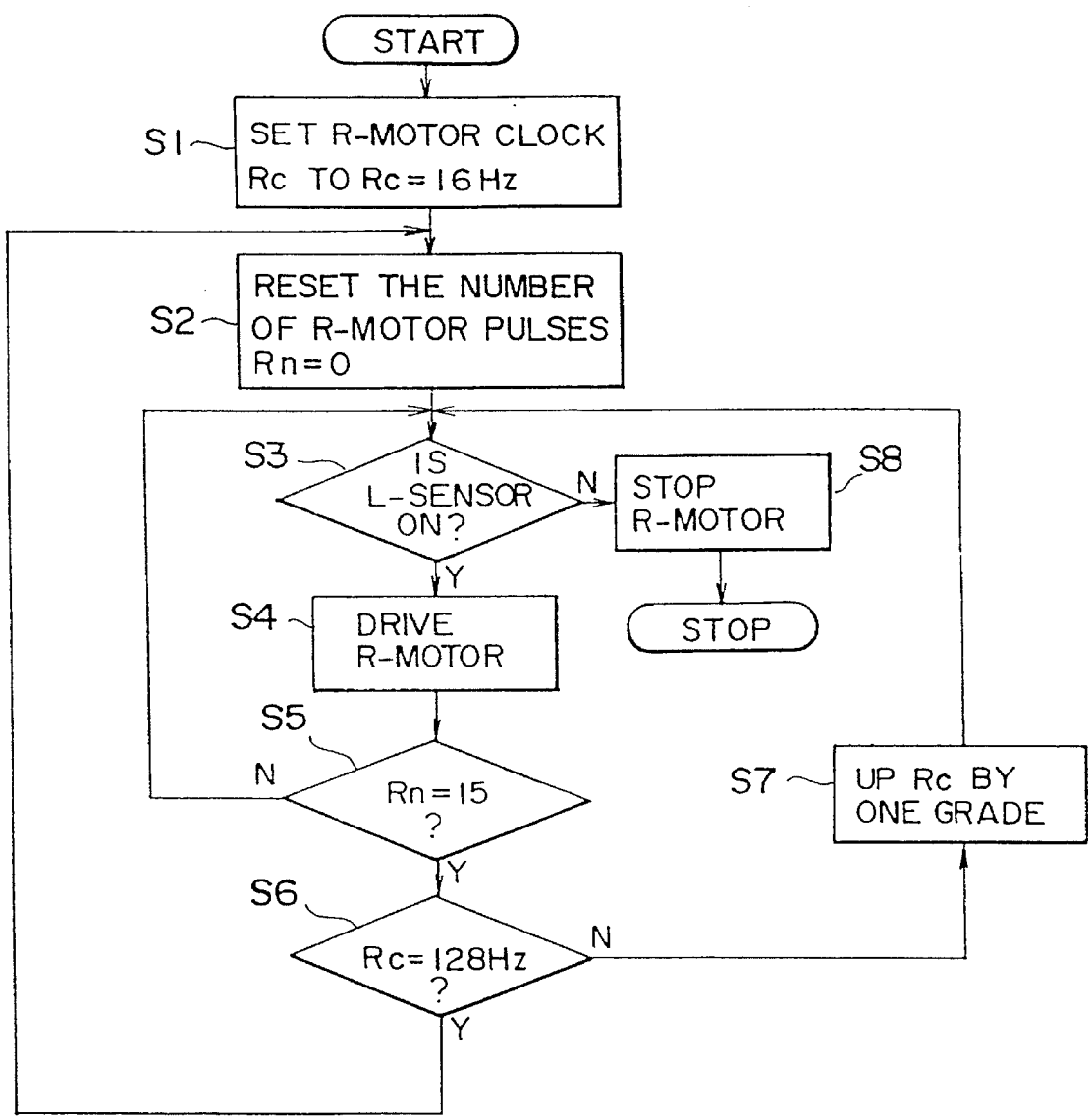
FIG. 13 is a timing chart showing the basic operation of the robot of the embodiment of FIG. 5 at the time of starting the driving.

FIG. 13 is a flowchart showing the fundamental operation when acceleration control is performed at the time of starting drive. First, the CPU core 40 sets the clock frequency Rc of driving pulses for driving the stepping motor 64 to 16 Hz (S1), and next resets the value Rc of a counter for counting the driving pulses (S2). Next, judgment is made as to whether the light detection output from the sensor 12 exists or not (S3). In the case where the light detection output exists, the CPU core 40 applies driving pulses having the clock frequency Rc to drive the stepping motor 64 and counts the pulses at that time (S4). Judgment is made as to whether the count value Rn is a predetermined value, for example, 15 or not (S5), and if the value is not 15, the foregoing processings (S3) and (S4) are repeated.

After driving corresponding to 15 pulses is carried out with the driving pulse of the clock frequency Rc (=16 Hz), judgment is made as to whether the clock frequency Rc of the driving pulses has reached 128 Hz (the maximum value) or not. If the judgment proves that the frequency does not reach the value, the CPU core 40 sets the clock frequency Rc of the driving pulse, for example, into 32 Hz (S7) and repeats the foregoing operations in the same manner as in the foregoing case. Then, when the clock frequency Rc of the driving pulse reaches 128 Hz (the maximum value) (S6), driving is performed at the driving pulse of the frequency thereafter. When no light detection output from the sensor 12 exists (S3), the stepping motor 64 is stopped (S8).

Although the flowchart shows the relation between the sensor 12 (L-sensor) and the stepping motor 64 (R-motor), the relation between the sensor 14 (R-sensor) and the stepping motor 66 (L-motor) is quite the same as the above relation.

Although description has not been made as to the relation between the sensors 12 and 14 in order to facilitate the understanding on the flowchart of FIG. 13, for example, if the sensor 14 is in the state of light detection so that the stepping motor 66 is driven to thereby make the robot body 10 move toward the light source, the sensor 12 comes into the state of light detection. In such a case, therefore, it is necessary to make the driving state of the stepping motor 64 driven by the sensor 12 coincide with that of the stepping motor 66. If both the driving states do not coincide with each other, the robot body 10 becomes impossible to move linearly at a point of time when the robot body 10 is turned toward the light source. That is, it is impossible to change the movement from turning one to linear one.

Figure 14:
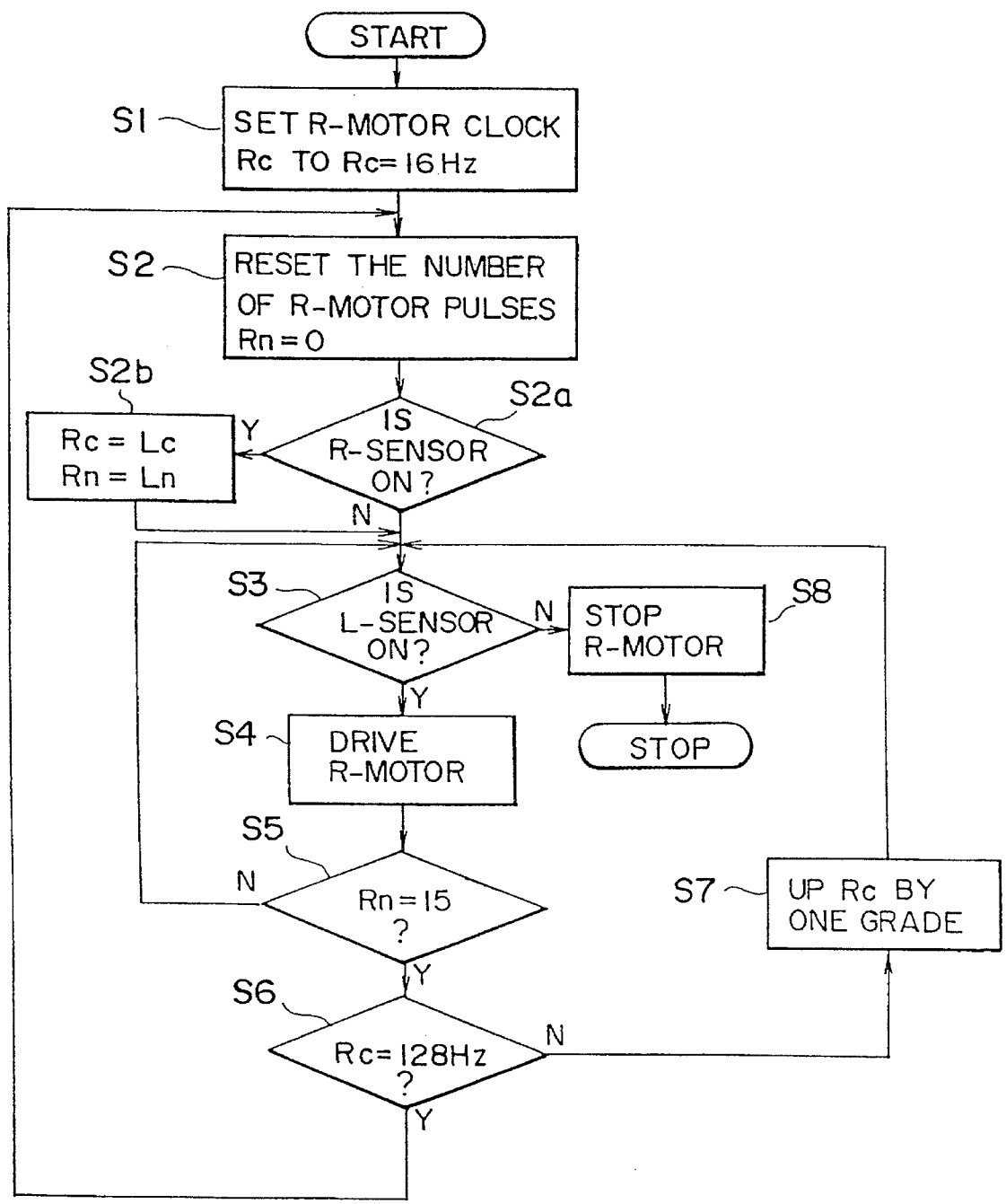
FIG. 14 is a timing chart showing the operation of the robot of the embodiment of FIG. 5 at the time of starting the driving.

FIG. 14 is a flowchart showing the control when the foregoing points are considered. Similarly to the foregoing case, the CPU core 40 sets the clock frequency Rc of the driving pulses for the stepping motor 64 to 16 Hz (S1) and then resets the value Rc of the counter for counting the number of the driving pulses (S2). Next, judgment is made as to whether the light detection output of the other sensor 14 exists or not (S2a). In the case where the light detection output of the sensor 14 exists, the clock frequency Lc of the driving pulses of the control system and the value Ln of the counter at the sensor 14 side are initialized so as to be coincident with the clock frequency Rc of the driving pulses and the value Rn of the counter at the sensor 12 side respectively. After such setting, processing is performed in the same manner as in the flowchart of FIG. 13. Although this flowchart shows the operation of the control system for the sensor 12, the operation of the control system for the sensor 14 is the same as the above operation.

That is, when the control system for the other sensor is in the driving state at the time of starting drive, the driving for the control system for the one sensor is started after the driving state of the control system for the other sensor has been taken in as the initial value. Therefore, the direction is changed with acceleration when only one of the sensors detects light, and then when both the sensors detect light, both the control systems are made to be in the same driving state at that moment so that straight moving is performed. Consequently, the change from turning movement to linear movement can be smoothly performed to thereby improve the light response property.

FIGS. 15A–15D illustrate a waveform diagram of the driving pulses. In order to improve the driving force when the speed increases at the time of starting drive as shown in the flowcharts of FIGS. 13 and 14, for example, the pulse width is enlarged to be 7.8 msec in the case of the clock frequency of 16 Hz. Since the pulse width decreases as the frequency becomes high, the pulse width is made to be 6.3 msec in the case of the clock frequency of 32 Hz, 5.9 msec in the case of the clock frequency of 64 Hz, and 3.9 msec in the case of the clock frequency of 128 Hz. Thus, it is possible to supply driving pulse corresponding to a required driving force to thereby make it possible to perform rational driving.

Figure 17:
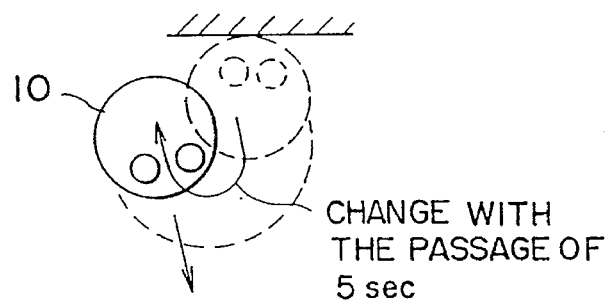
FIG. 17 is an explanatory view of the above avoiding operation.

FIG. 16 is a flowchart showing processing in the case of avoiding an obstacle, and FIG. 17 is a diagram for explaining the avoiding operation. An obstacle sensor constituted by an ultrasonic sensor, an overcurrent sensor, or a touch sensor, or any combination of those sensors is provided at the front portion of the robot body 10, although such an obstacle sensor is not illustrated in the drawing.

First, by using the obstacle sensor, judgment is made as to whether there is an obstacle or not (S11). If there is no obstacle, work is continued as it is (or advancing is made as it is) (S12). If there is any obstacle, on the contrary, the stepping motor 64 or 66 is reversely rotated (S13). This state is continued for a predetermined time, for example, 5 minutes (S14). Since this time may be set to a value sufficient for changing the direction, the time is not limited to the above-mentioned value. Alternatively the distance of movement may be set in place of the time. Thereafter, judgment is made by means of the obstacle sensor again as to whether there is any obstacle or not (S11). By repeating such processing, the direction is changed if there is any obstacle to thereby avoid the obstacle.

Figure 18:
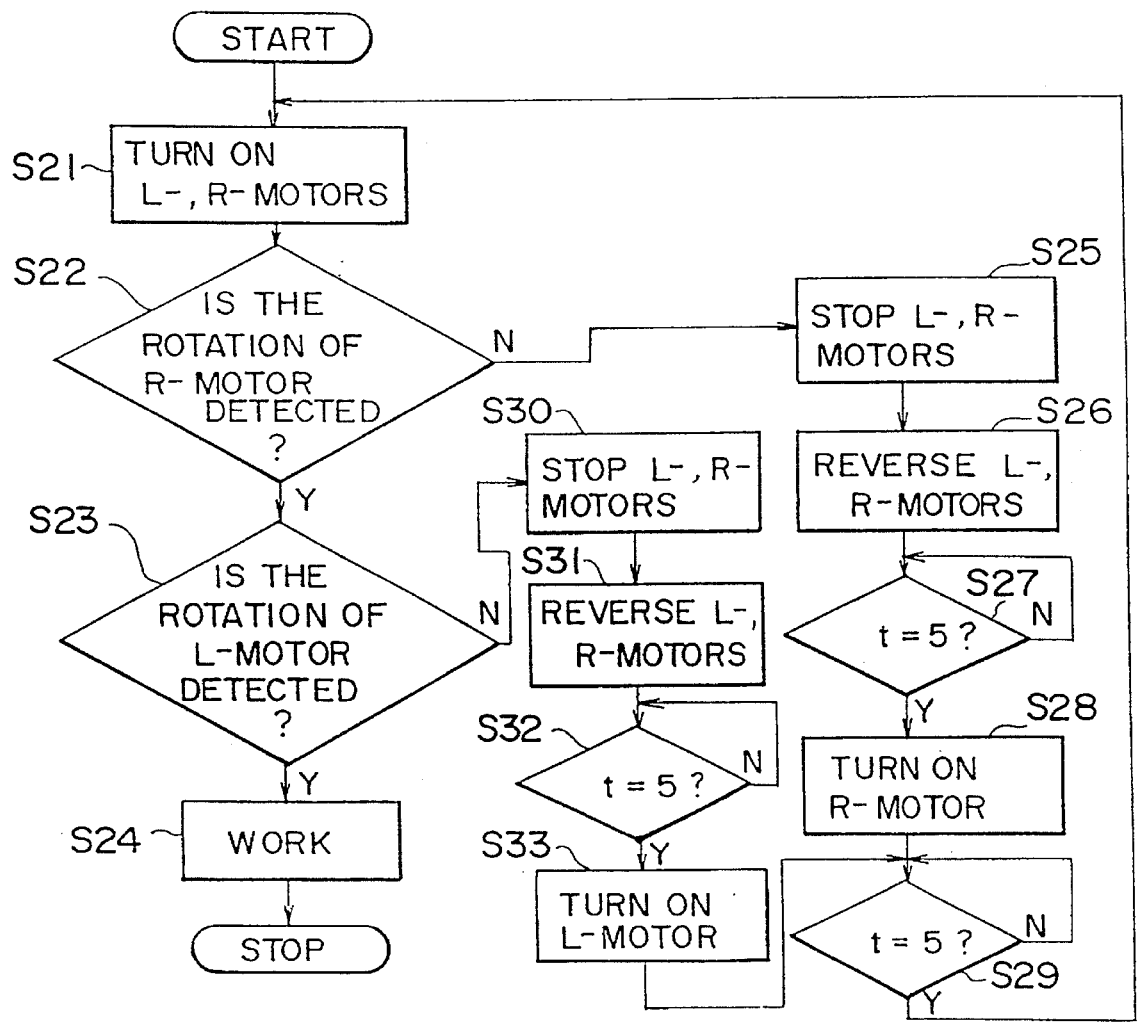
FIG. 18 is a flowchart showing the processing (No. 2) in the case of avoiding an obstacle.

FIG. 18 is a flowchart showing the processing in the case where collision is detected on the basis of an induced voltage in the stepping motor and an obstacle is avoided, and FIG. 19 is a diagram for explaining the avoiding operation. The stepping motors 64 and 66 are turned on (S21) and judgment is made as to whether the stepping motor 64 is rotating in this state or not (S22). If the motor 64 is rotating, judgment is made as to whether the stepping motor 66 is rotating or not (S23). If also the stepping motor 66 is rotating, it is concluded that there is no obstacle and work is continued (S24). Further, the method of detection as to whether the stepping motors 64 and 66 are rotating or not is performed by utilizing the fact that a large voltage is induced in the exciting coil 68 when the motor rotates and, on the contrary, a small voltage is induced in the exciting coil 68 when the motor is not rotating.

FIGS. 20A and 20B illustrate a timing-chart showing the method of detection as to whether the stepping motor is rotating or not. When the stepping motor is in the rotating state as shown in the drawing and in the case where the rotor 70 rotates after application of the driving pulses, an induced voltage is induced and an induced current flows in the exciting coil 68 as the rotor 70 rotates. The value of the induced current is detected, for example, by using a comparator so that the rotating state can be grasped. When the stepping motor is not in the rotating state, on the contrary, the rotor 70 never rotate after application of the driving pulses so that no induced voltage is induced and no induced current flows in the exciting coil 68. Thus, it is possible to detect the fact that the stepping motor is not in the rotating state.

In the case where it is concluded that the stepping motor 64 is not rotating in detection of rotation of the stepping motor 64 (S22), the driving for the stepping motors 64 and 66 is stopped (S25) and the stepping motors 64 and 66 are made to rotate reversely (S26). The reverse driving state is continued, for example, for 5 minutes (S27). Next, the stepping motor 64 which had been concluded so as to to be in the not-rotating state is driven again (S28) and the state is continued, for example, for 5 minutes (S29). Then, the operation is returned to the first processing (S21). Further, in the case where the stepping motor 66 is concluded so as not to be rotating in detection of rotation of the stepping motor 66 (S23), the driving for the stepping motors 64 and 66 are stopped (S30) and the stepping motors 64 and 66 are reversely rotated (S31). The reverse driving state is continued, for example, for 5 minutes (S32). The stepping motor 66 is driven again (S33) and this state is continued for 5 minutes (S29). Thereafter, the operation is returned to the first processing (S21).

As described above, the fact that the stepping motors 64 and 66 are rotating or not is detected, and if it is concluded that one of the stepping motors 64 and 66 is not rotating, the driving for the stepping motors is once stopped and then the stepping motors are reversely rotated. Next, the one stepping motor which is concluded so as to be not rotating is rotated again. For example, when the robot body 10 collides against a wall and a state where the stepping motor 66 is not rotating is generated, the driving for the stepping motors 64, and 66 are stopped once and the stepping motors are reversely rotated so as to retreat the robot body 10. Then, the stepping motor 66 is driven to thereby change the direction. Thereafter, the stepping motors 64 and 66 are driven so as to make the robot body 10 move straight. Consequently, the robot body 10 can travel while avoiding an obstacle.

Although description has been made as to avoidance of an obstacle in the state where the stepping motors 64 and 64 are being driven in accordance with the flowchart of FIG. 18, the same processing is performed also in the case where either one of the stepping motor 64 and 66 is being driven. When, for example, the stepping motor 64 is being driven, it is possible to cope with a trouble in such a manner that the stepping motor 64 is driven in the processing (S21) in FIG. 18, and then processing (S22) and processings (S25) through (S29) are performed. Similarly to this, also in the case where the stepping motor 66 is being driven, it is possible to cope with a trouble in such a manner that the stepping motor 66 is driven in the processing (S23) in FIG. 18 and then the processing (S23), the processings (S30) through (S33), and the processing (S29) are performed.

Figure 22:
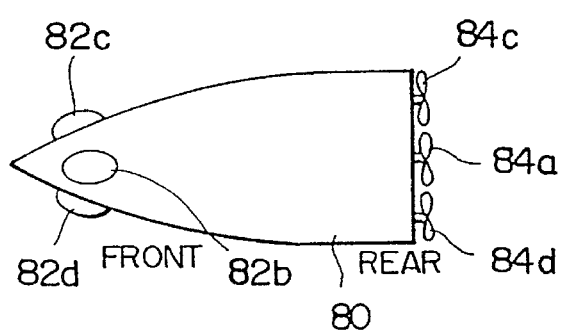
Figure 23:
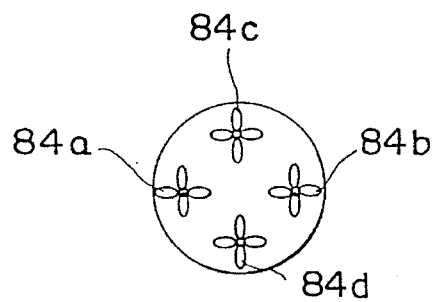

FIGS. 22 through 23 are a front elevation, a side elevation, and a rear elevation showing a micro robot according to a further embodiment of the present invention, respectively. The configuration is made such that sensors 82a through 82d are provided on a front portion of a robot body and screws 84a through 84d are provided on a rear portion thereof so that driving in a fluid can be performed. Since the four, left, right, upper and lower screws 84a through 84d are provided so as to be driven by stepping motors respectively, it is a matter of course that the robot body 80 can be controlled in the left/right direction as well as in the up/down direction. Further, the robot of FIG. 1 or 5 has only two motors and therefore respective driving pulses are supplied to the motors in the same timing. In this embodiment, however, the timing of driving pulses is shifted from each other by means of a circuit shown in FIG. 24 because the four screws 84a through 84d are provided and it is therefore necessary to provide four stepping motors for driving the screws 84a through 84d and because if the stepping motors are driven on the basis of the driving pulses of the same timing, the consumption of a power source portion 16 remarkably increases.

Figure 24:
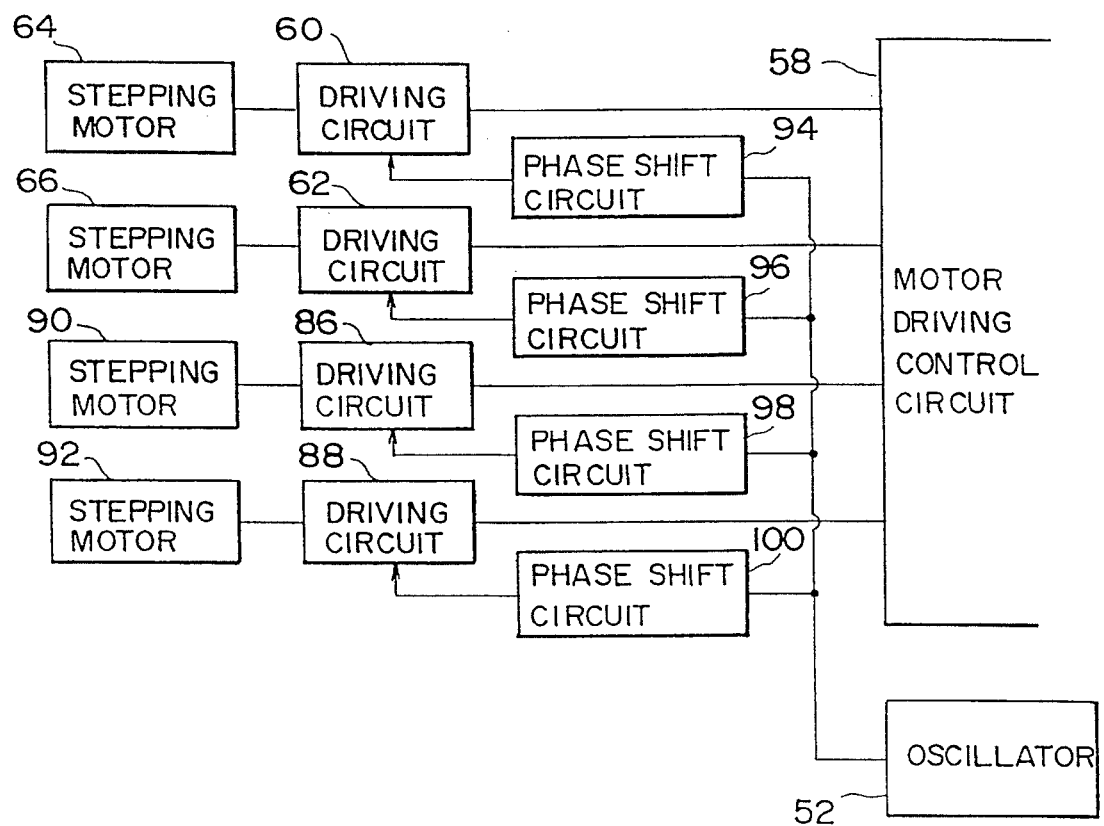
FIG. 24 is a block diagram showing the peripheral circuits of the motor driving circuit of the embodiment of FIGS. 21 through 23.

FIG. 24 is a block diagram showing circuits in the periphery of a motor driving circuit. In the circuit diagram, motor driving circuits 86 and 88 are provided in addition to motor driving circuits 60 and 62 of FIG. 8 and the driving circuits drive stepping motors 64, 66, 90, and 92 respectively. Further, the stepping motors 64, 66, 90, and 92 drive the screws 84a through 84d to rotate respectively. In this embodiment, phase difference circuits 94 through 100 for controlling the phases of the motor driving circuits 60, 62, 86, and 88 are provided and the phase adjustment angles of the phase difference circuits 94 through 100 are different from each other so that the driving pulses are not produced from the motor driving circuits 60, 62, 86, and 88 in the same timing.

Figure 21:
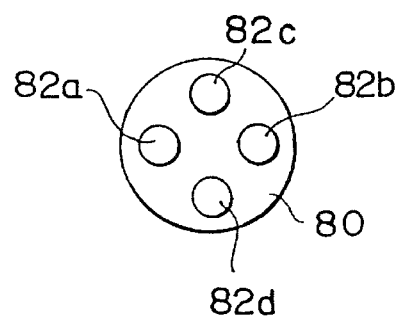
FIGS. 21, 22 and 23 are a front view, a side view and a back view of an embodiment of the micro robot according to the present invention.

Although description has been made as to the example in which light is detected by means of sensors so that the robot body advances toward the light in the foregoing embodiments, a subject to be detected is not limited to light, it may be magnetism, heat (infrared rays), sound, an electromagnetic wave, and so on. Moreover, the robot body can be controlled so as not to move toward a subject to be detected but to run away therefrom. In this case, in the embodiment of FIG. 1 or 5, the sensor 12 is turned off to thereby drive the stepping motor 64 so as to drive the wheel 38. The sensor 14 is turned off to thereby drive the stepping motor 66 so as to drive the wheel 36. When both the sensors 12 and 14 are in the turned-on state, the stepping motors 64 and 66 are reversely driven to thereby reversely drive the wheels 38 and 36 respectively so that the robot body 10 is retreated or made to run away. Further, if two kinds or more of subjects to be detected are prepared and if control is made so that the robot body 10 moves toward one subject to be detected and run away from the other subject to be detected, it is possible to perform delicate control. It is a matter of course that this control can be applied to the robot body 100 of FIGS. 21 through 23.

Not only the movement direction of the robot body is determined on the basis of a subject such as light or the like to be detected, but, for example, a movement locus may be programmed in advance so as to perform control on the basis of the movement locus. Alternatively, the movement locus may be controlled by application of instruction from the outside. Moreover, a suitable combination of the foregoing controls may be performed while a studying function is given thereto.

Figure 25:
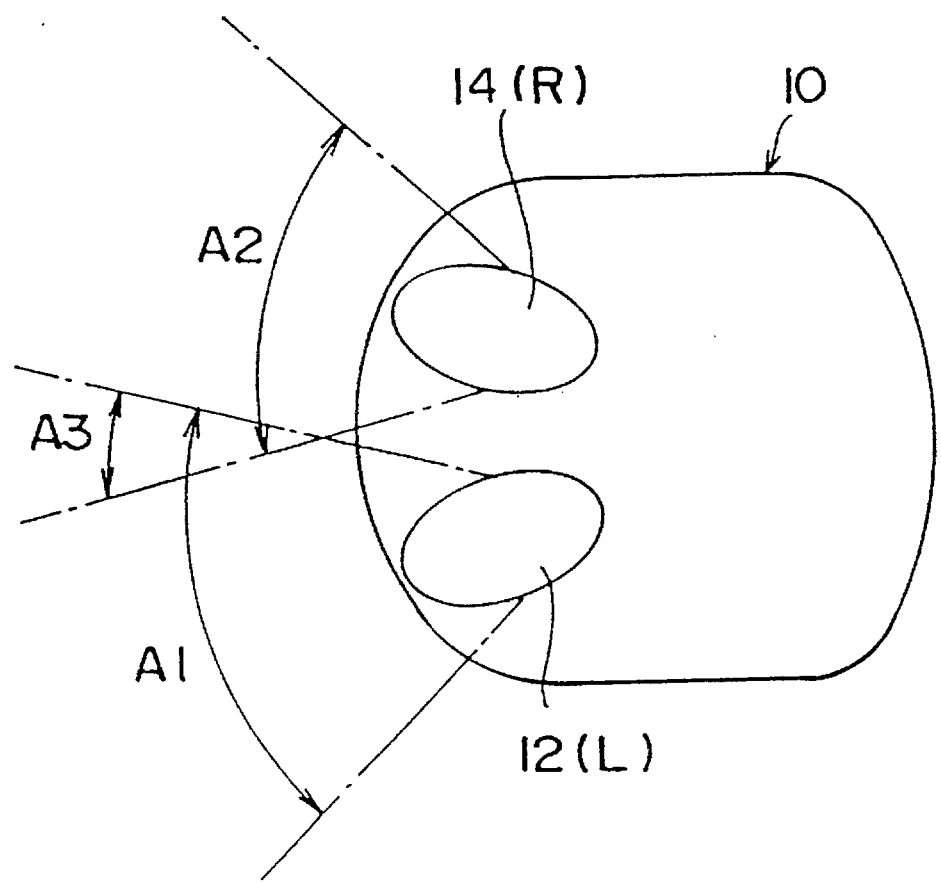
FIG. 25 is a top view of a further embodiment of the micro robot according to the present invention.

FIG. 25 is a top plan view showing a micro robot according to a still further embodiment of the present invention. A pair of direction control sensors 12 and 14 are provided at a front portion of a robot body 10 as shown in the drawing, and a work control sensor 15 is further provided at an upper portion of the robot body 10 as shown in the drawing so that working instruction is received from the outside through the work control sensor 15 as will be described later. Moreover, the bottom plan view of the robot body 10 is the same as that of the embodiment of FIG. 6.

Figure 26:
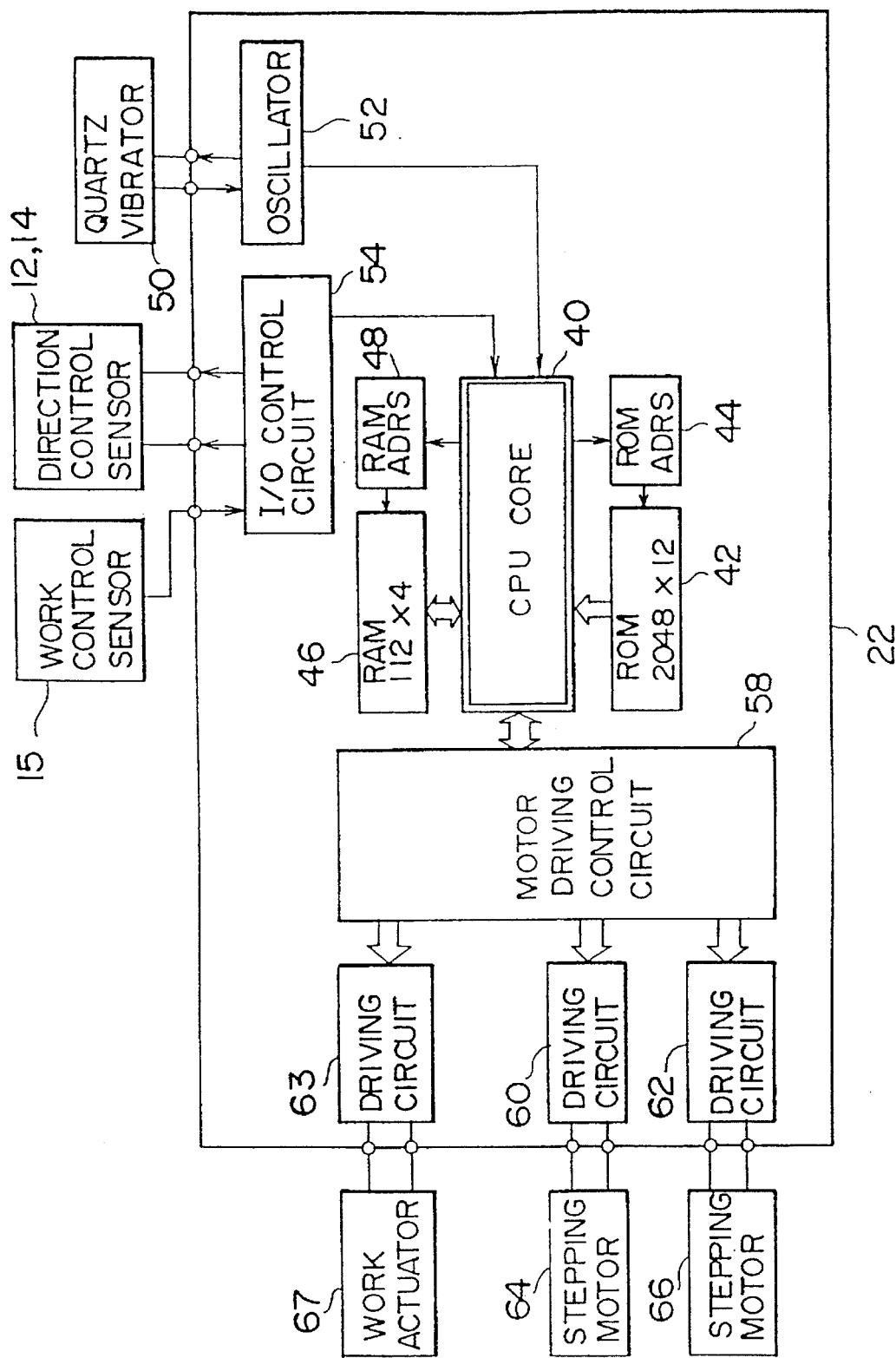
FIG. 26 is a block diagram showing in detail the circuit portion of the embodiment of FIG. 25.

FIG. 26 is a block diagram showing a circuit portion 22 of the embodiment of FIG. 25 in detail. A CPU core 40 constituted by an ALU, various registers, and the like is connected to an ROM 42 carrying programs stored therein, an address decoder 44 for the ROM 42, an RAM 46 for storing various data, and an address decoder 48 for the RAM 46. A quartz vibrator 50 is connected to an oscillator 52 and an oscillation signal of the oscillator 52 is supplied to the CPU core 40 as a clock signal. Outputs of direction control sensors 12 and 14 and an output of a work control sensor 15 are inputted to an I/O control circuit 54 and outputted to the CPU core 40. A motor driving control circuit 58 performs delivery of control signals between the motor driving control circuit 58 and the CPU core 40 so as to control stepping motors 64 and 66 through motor driving circuits 60 and 62 respectively and so as to control a work actuator 67 through an actuator driving circuit 63.

The stepping motor 64 is stated as an R-motor in a flowchart of the drawing which will be described later because the motor 64 is built in a driving portion 30 and disposed at a right side portion in the robot body 10, and, similarly to this, the stepping motor 66 is stated as an L-motor because the motor 66 is built in the driving portion 28 and disposed at a left side portion in the robot body 10.

Figure 27:
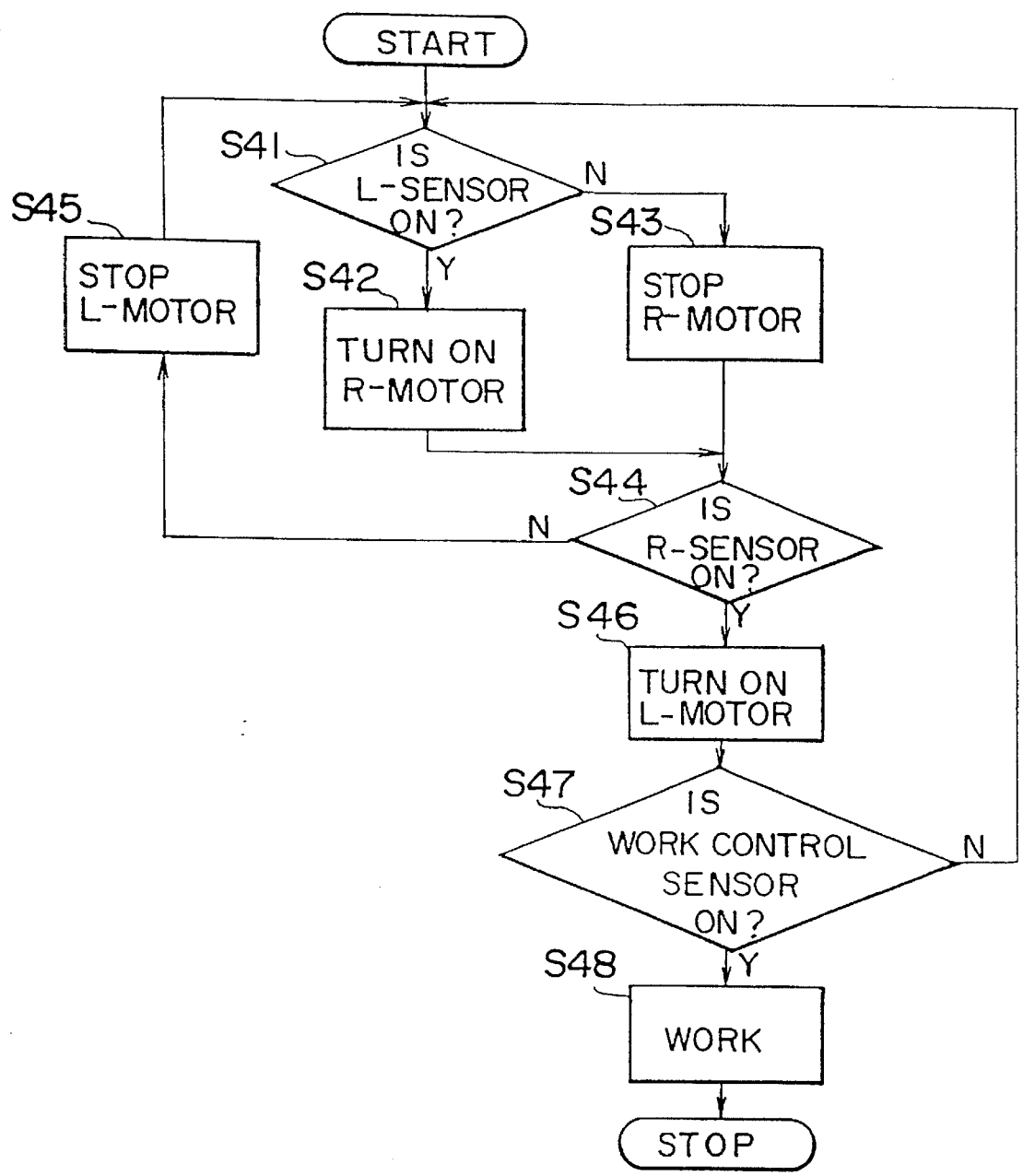
FIG. 27 is a flowchart showing the control operation of the circuit portion of FIG. 26.

FIG. 27 is a flowchart showing the control operation of the circuit portion of FIG. 26. Movement is performed toward a light-emitting target on the basis of the direction control sensors 12 and 14, and the work sensor 15 receives instruction from an operator so as to perform predetermined work.

First, the CPU core 40 judges whether the direction control sensor 12 is in the turned-on state because it detects light or not (S41). If the sensor 12 is in the turned-on state, it is concluded that a light source is located on the left and the stepping motor 64 is driven to thereby drive the wheel 38 to rotate so as to perform left turning (S42). If the direction control sensor 12 is in the turned-off state (S41), on the contrary, driving of the stepping motor 64 is stopped (S43). Next, judgment is made as to whether the direction control sensor 14 is in the turned-on state because of detection of light or not (S44), and if the sensor 14 is not in the turned-on state, driving of the stepping motor 66 is stopped (S45). If the direction control sensor 14 is turned on by repetition of the foregoing processing (S44), the stepping motor 66 is driven (S47). The robot body 10 moves toward the light source through such operation. Next, judgment is made as to whether the work control sensor 15 detects light or not (S47), and in the state where the work control sensor 15 does not detect light the robot body advances through repetition of the foregoing operation. If the work control sensor 15 is in the turned-on state because of detection of light, the actuator driving circuit 63 controls the work actuator 67 to perform desired work (S48).

Figure 28:
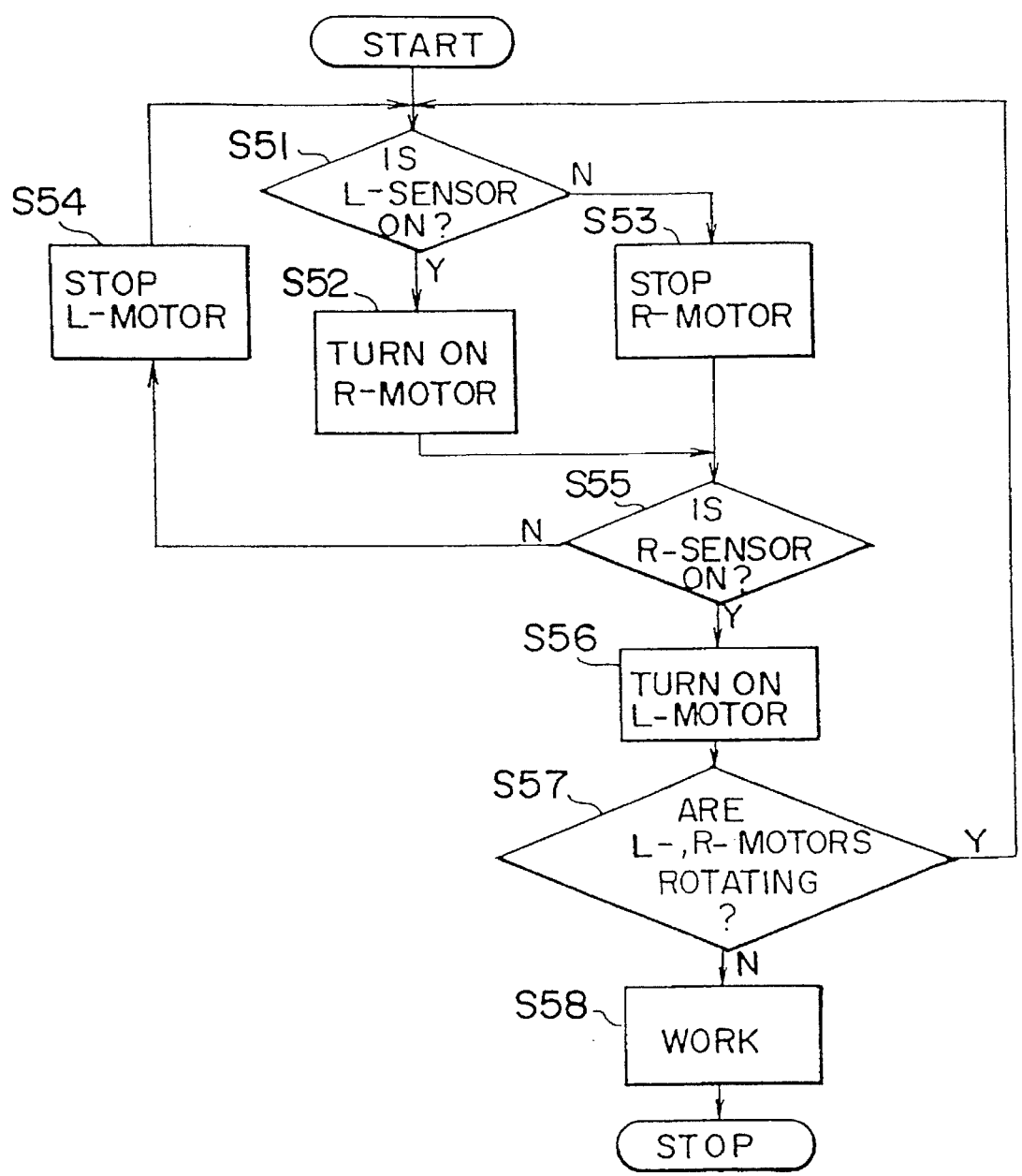
FIG. 28 is a flowchart showing the operation in the case where the work control sensor is not provided in FIGS. 25 and 26.

FIG. 28 is a flowchart showing the operation when the work control sensor 15 is not mounted in FIGS. 25 and 26. Also in this embodiment, first, the CPU core 40 judges whether the direction control sensor 12 is in the turned-on state because it detects light or not (S51). If the sensor 12 is in the turned-on state, it is concluded that a light source is located on the left and the stepping motor 64 is driven to thereby drive the wheel 38 to rotate so as to perform left turning (S52). If the direction control sensor 12 is in the turned-off state (S51), on the contrary, driving of the stepping motor 64 is stopped (S53). Next, judgment is made as to whether the direction control sensor 14 is in the turned-on state because of detection of light or not (S54), and if the sensor 14 is not in the turned-on state, driving of the stepping motor 66 is stopped (S55). If the direction control sensor 14 is turned on by repetition of the foregoing processing (S54), the stepping motor 66 is driven (S57). The robot body 10 moves toward the light source through such operation. Next, judgment is made as to whether the stepping motors 64 and 66 are rotating or not (S57), and in the state where the stepping motors 64 and 66 are rotating, the robot body advances through repetition of the foregoing operation. When the robot body 10 reaches and collides a predetermined point, the stepping motors 64 and 66 do not rotate at that moment. It is therefore concluded the not-rotation means that the robot body reaches a predetermined position, and then the actuator driving circuit 63 controls the work actuator 67 to perform desired work (S58).

Further, judgment is made as to whether the stepping motors 64 and 66 are rotating or not as follows. When the stepping motor is in the rotating state, the rotor 70 rotates after the driving pulse is supplied to the exciting coil 68 and an induced voltage is induced so that an induced current flows in the exciting coil 68 with the rotation of the rotor 70. The value of the induced current is detected by means of a comparator or the like so as to detect the fact that the stepping motor is in the rotating state. When the stepping motor is not in the rotating state, the rotor 70 does not rotate after application of the driving pulse and therefore no induced voltage is induced in the exciting coil 68. It is detected from this fact that the stepping motor is not in the rotating state.

Figure 29:
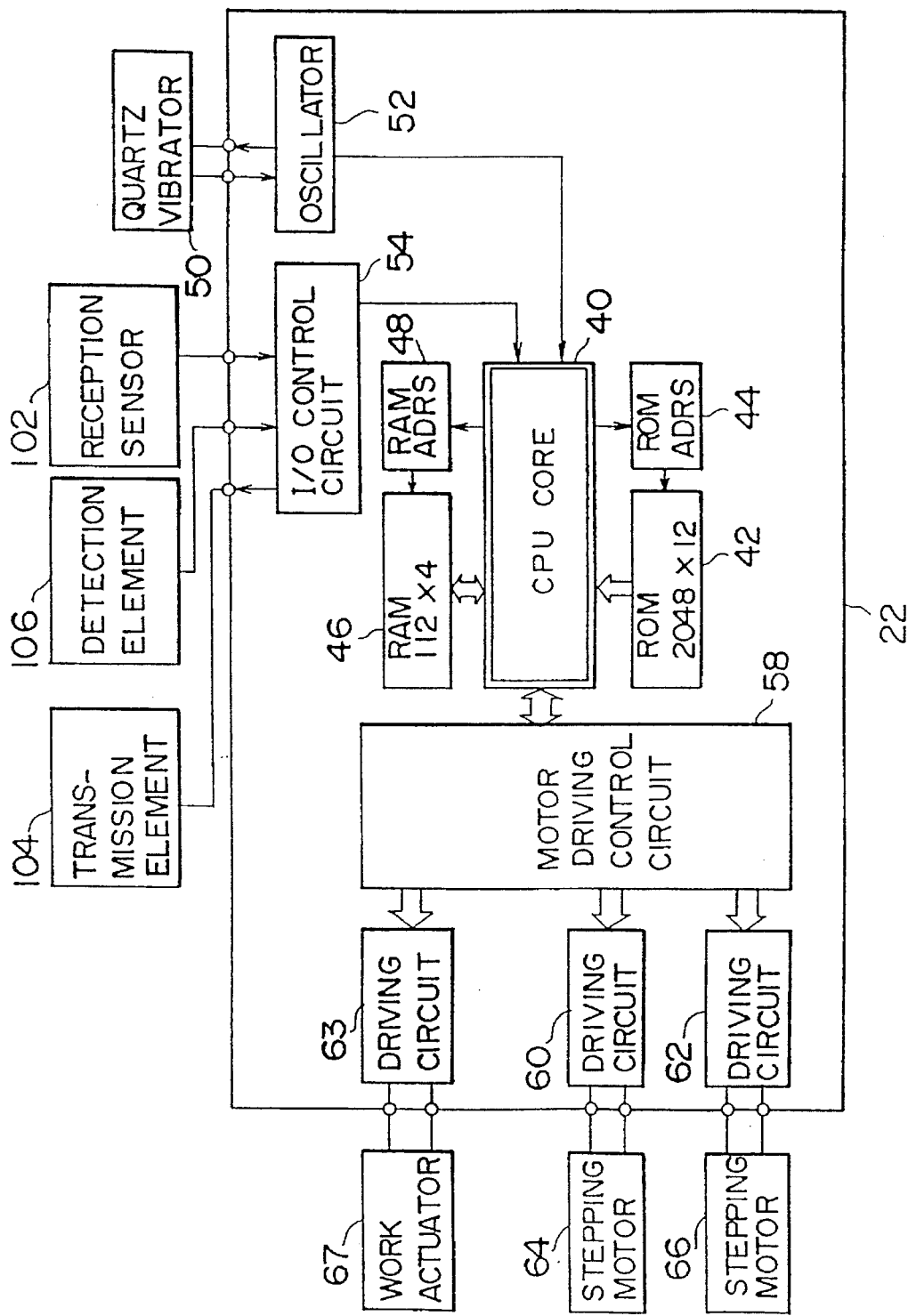
FIG. 29 is a block diagram showing in detail another embodiment of the circuit portion.
Figure 30:
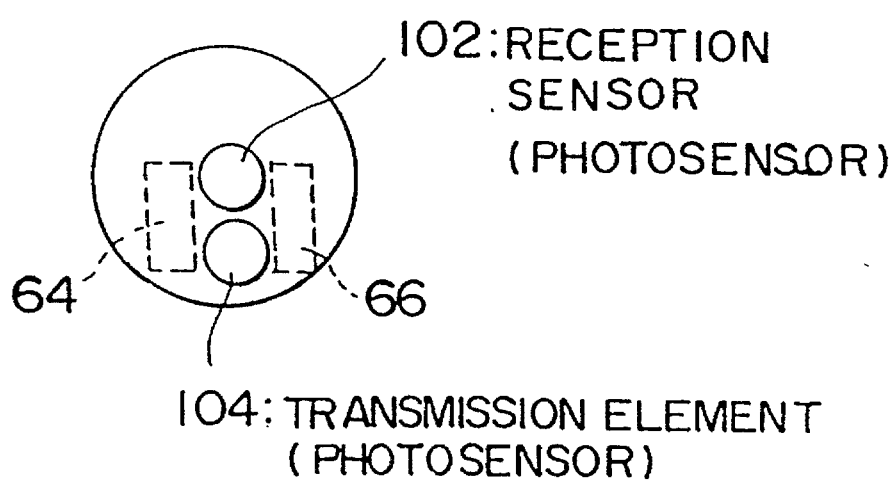
FIG. 30 is a top view of the robot body of another embodiment of the present invention.

FIG. 29 is a block diagram showing another embodiment of the circuit portion 22 in detail. In this embodiment, a reception sensor 102, a transmission element 104, and a detection element 106 are connected, as the sensors, to an I/O control circuit 54. FIG. 30 is a top plan view showing a robot body 10 in which the reception sensor 102 and the transmission element 104 are disposed in the illustrated position. In this embodiment, the reception sensor 102 is configured so as to receive moving and working instruction. A pulse signal or the like having a pattern corresponding to the instruction (a straight-moving instruction, a right-turning instruction, a left-turning instruction, a retreating instruction, a working instruction, or the like) is supplied to the light reception sensor 102 by utilizing, for example, infrared rays. The detection element 106 is constituted, for example, by an image sensor, a tactual sensor, or the like, and information detected in the detection element 106 is transmitted to the operation side by using the transmission element 104.

Figure 31:
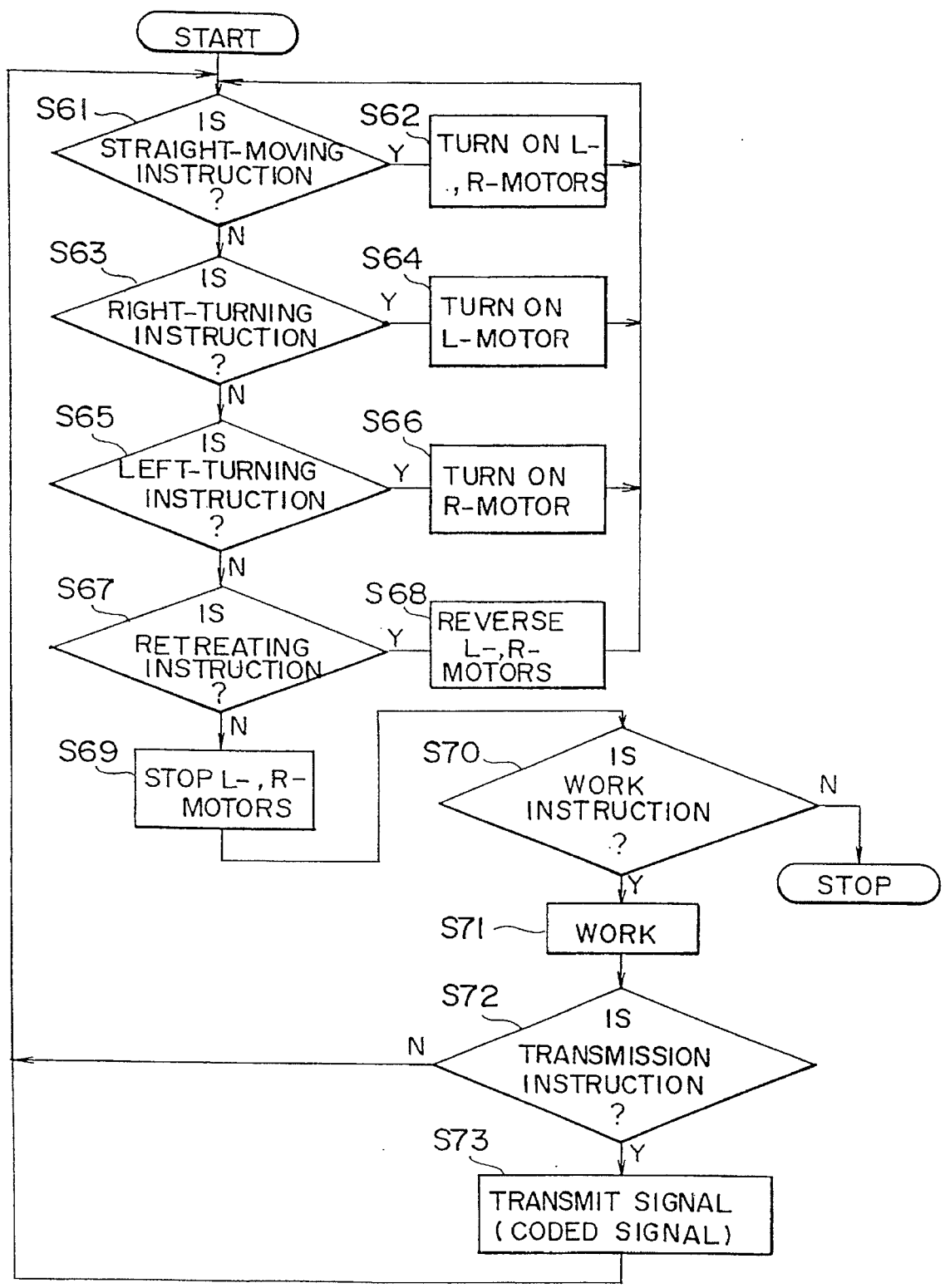
FIG. 31 is a flowchart showing the control operation of the circuit portion of FIG. 29.

FIG. 31 is a flowchart showing the control operation of the circuit portion of FIG. 29. First, when the reception sensor 102 receives a straight-moving instruction from the operation side, the CPU core 40 detects the instruction (S61) and drives the stepping motors 64 and 66 so as to perform straight moving (S62). When the reception sensor 102 receives a right-turning instruction from the operation side, the CPU core 40 detects the instruction (S63) and drives the stepping motor 66 so as to perform right-turning (S64). When the reception sensor 102 receives a left-turning instruction from the operation side, the CPU core 40 detects the instruction (S65) and drives the stepping motor 64 so as to perform left turning (S66). When the reception sensor 102 receives a retreating instruction from the operation side, the CPU core 40 detects the instruction (S67) and reversely drives the stepping motors 64 and 66 so that the robot body 10 is retreated (S68). When there is not any movement control instruction, driving of the stepping motors 64 and 66 is stopped (S69). Next, the CPU core 40 judges whether a working instruction is supplied or not (S70). If no working instruction is supplied, the processing is completed as it is. If a working instruction is supplied, on the contrary, the actuator driving circuit 63 controls the work actuator 67 to perform desired work (S71). Thereafter, the CPU core 40 judges whether a transmission instruction is supplied through the reception sensor 102 or not (S72). If a transmission instruction is supplied, information detected, for example, by means of the detection element 106 is coded and transmitted to the operation side through the transmission element 104 (S73). The foregoing processing is cyclically repeated.

Various work may be listed as the foregoing work, and examples of the work are as follows.

(1) Ejection of a medical fluid with a micro pump.

(2) Sensing of temperature, pressure, components, images, and the like.

(3) Work by hands (for example, carrying parts or the like).

(4) Data storage and transmission.

(5) Action by a micro robot itself (for example, boring, working by its self-destruction, integral working by robots with various functions).

(6) Taking and throwing-away of samples.

Figure 32:
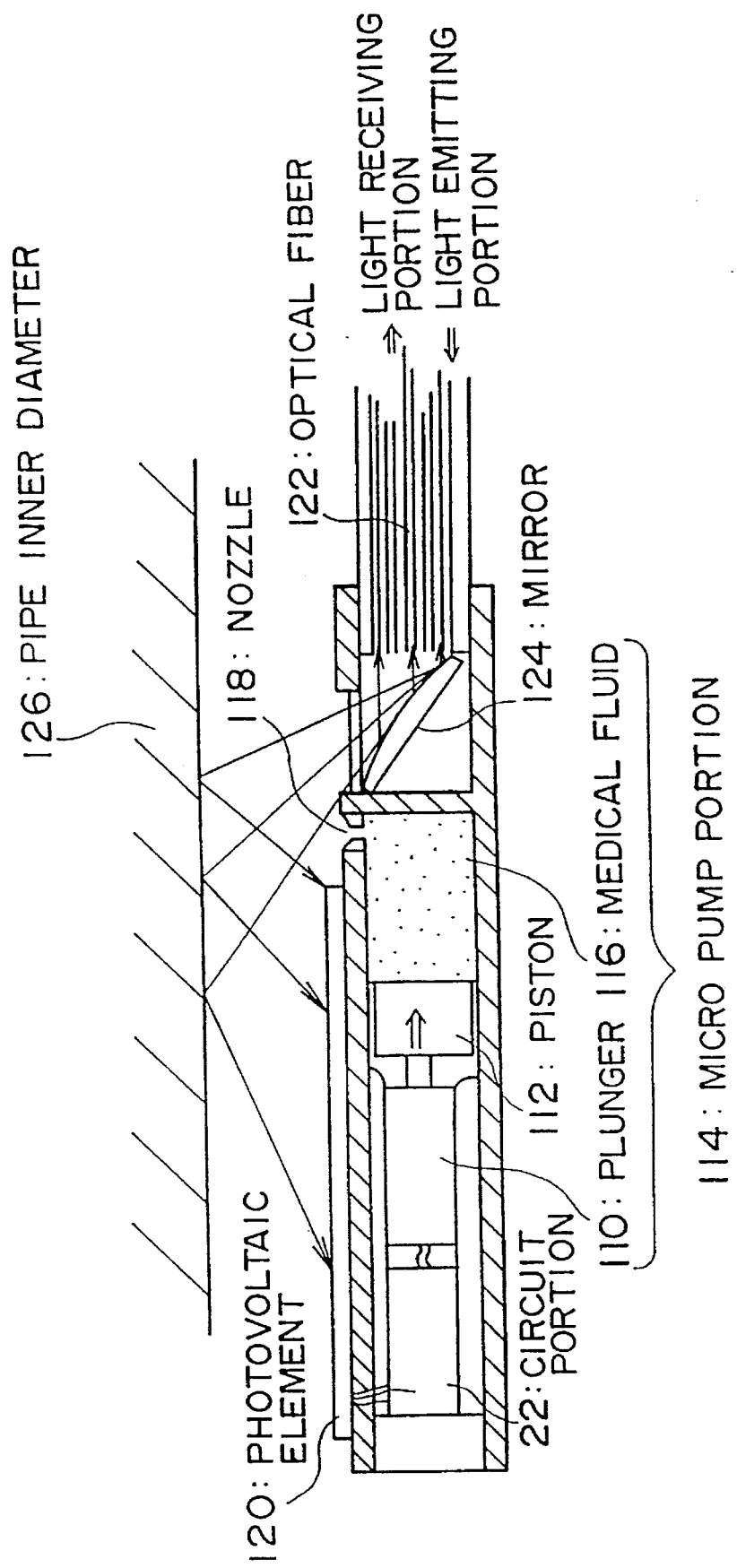
FIG. 32 is a sectional view showing an example in which the micro robot according to the present invention is applied to an endoscope.

FIG. 32 is a section showing an example in which the micro robot according to the present invention is applied to an endoscope. This device has a plunger 110 to be controlled by a circuit portion 22 and the plunger 110 drives a piston 112 provided at a front portion thereof. A micro pump 114 is constituted by the plunger 110 and the piston 112, and a medical fluid 116 is injected into a pipe through a nozzle 118 by movement of the piston 112. A photovoltaic element 120 is attached on an outer periphery of the robot. Light from a light emitting portion is led through optical fibers 122, reflected from a mirror 124, further reflected by a pipe inner wall 126, and led to a light detection portion through the passage reverse to the foregoing one so as to perform the function of the endoscope. The light reflected from the pipe inner wall 126 is partially supplied also to the photovoltaic element 120 so as to charge a power source portion (not shown) of a circuit portion 22. Further, although the configuration of this embodiment is the same as that of the embodiment described in FIGS. 25 and 26 in the fundamental thinking, the members such as the sensors 12 and 14, the wheels 36 and 38, the stepping motors 64 and 66, and the like are not required to be provided.

In this embodiment, the circuit portion 22 is provided therein with a decoder and the decoder is connected in parallel to the power source portion connected to the output of the photovoltaic element 120 so as to take and analyze a control signal contained in a charged current. In this embodiment, therefore, a working instruction is received from the operation side through the optical fibers 122 at a desired position while observation of the inside of the pipe is performed as the endoscope, and the circuit portion 22 takes in the instruction through the photovoltaic element 120 to drive the plunger 110 to eject the medical fluid 124 from the nozzle 118.

FIG. 33 is a bottom view of a micro robot according to another embodiment of the present invention, and FIG. 34 is a side view thereof. In the micro robot in this embodiment, a micro pump 130 is built in the micro robot body shown in FIG. 25, and a nozzle 132 is provided in the front portion thereof. In this embodiment, the micro pump 130 is driven to inject medicinal fluid from the nozzle 132, for example, in the work (S48) in the flowchart of FIG. 27, the work (S58) in the flowchart of FIG. 28, and the work (S71) in the flowchart of FIG. 31.

FIG. 35 is a side view of a micro robot according to another embodiment of the present invention, and FIG. 36 is a bottom view thereof. In the micro robot in this embodiment, a hand mechanism is provided in a robot body 10. An upper motor unit 140 is provided in the upper portion of the robot body 10 so as to rotate an upper pinion 142 so that the upper pinion 142 engages with an upper gear 144 to drive an upper arm 146 supported rotatably by a shaft 152. A lower motor unit 148 is provided in the lower portion of the robot body 10 so as to rotate a lower pinion 149 so that the lower pinion 149 engages with a lower gear 150 to drive a lower arm 154 supported rotatably by the shaft 152. These upper and lower arms 146 and 154 constitute a hand 156.

Figure 37:
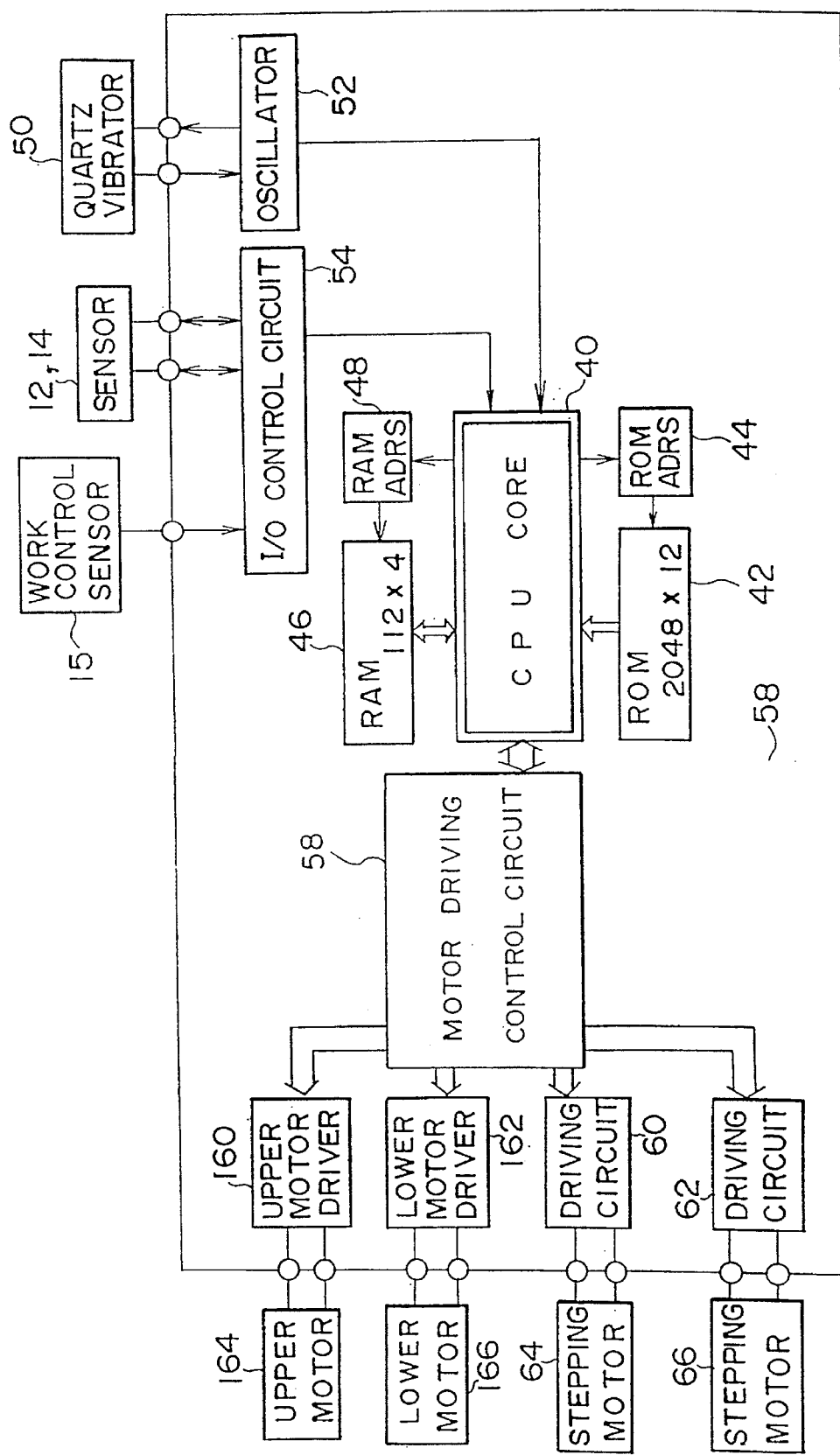
FIG. 37 is a block diagram showing in detail the circuit portion of the micro robot of FIGS. 35 and 36.

FIG. 37 is a block diagram illustrating the details of a circuit portion 22 of the micro robot of the embodiment of FIGS. 35 and 36. This embodiment is basically the same as that of the circuit diagram of FIG. 26, except that upper and lower motor drivers 160 and 162 are provided. The upper motor driver 160 drives and controls an upper motor 164 built in the upper motor unit 140, and the lower motor driver 162 drives and controls a lower motor 166 built in the lower motor unit 148. Preferably the upper and lower motors 164 and 166 are constituted by stepping motors, and in such a case it is easy to drive the upper and lower motors 164 and 166 synchronously.

Figure 38:
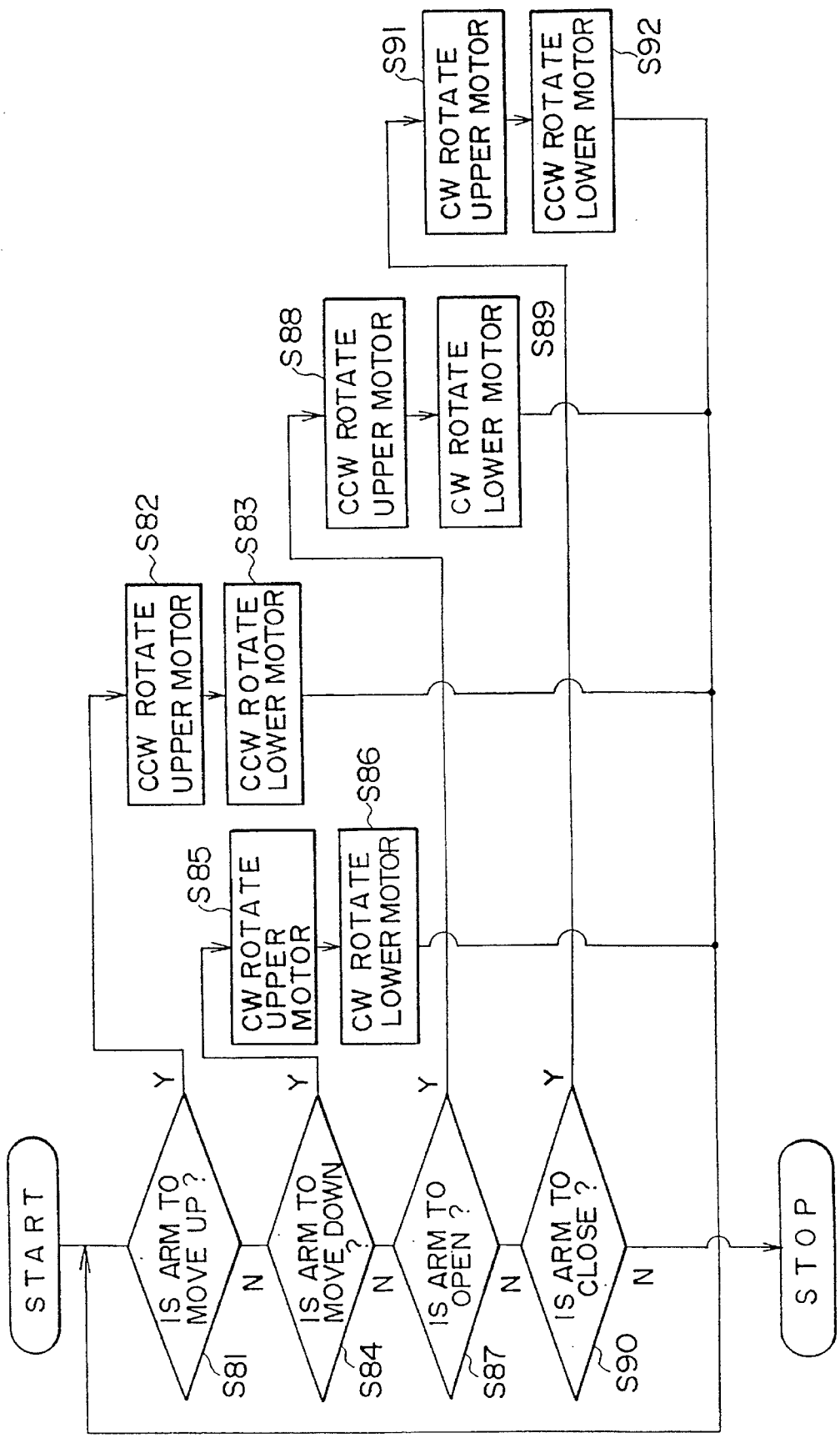
FIG. 38 is a flowchart showing the control operation of the micro robot of FIGS. 35 through 37.

FIG. 38 is a flowchart illustrating the control operation of the micro robot in the embodiment of FIGS. 35 to 37. First, if a work control sensor 15 receives a control instruction, a CPU core 40 judges whether the instruction is an instruction to move up the arm or not (S81). If the instruction is an instruction to move up the arm, the upper motor 164 is rotated counterclockwise by the upper motor driver 160 (S82). Consequently the upper arm 146 is rotated clockwise. Next, the lower motor 166 is rotated counterclockwise by the lower motor driver 162 (S83). Consequently the lower arm 154 is rotated clockwise. The hand 156 is moved up as shown in FIG. 39 by rotating both the upper and lower arms 146 and 154 clockwise in such a manner.

On the contrary, if the CPU core 40 receives an instruction to move down the arm (S84), the upper motor 164 is rotated clockwise by the upper driver 160 (S85). Consequently the upper arm 146 is rotated counterclockwise. Next, the lower motor 166 is rotated clockwise by the lower driver 162 (S86). Consequently the lower arm 154 is rotated counterclockwise. The hand 156 is moved down by rotating both the upper and lower arms 146 and 154 counterclockwise in such a manner.

On the other hand, if the CPU core 40 receives an instruction to open the arm (S87), the upper motor 164 is rotated counterclockwise by the upper driver 160 (S88). Consequently the upper arm 146 is rotated clockwise. Next, the lower motor 166 is rotated clockwise by the lower driver 162 (S89). Consequently the lower arm 154 is rotated counterclockwise. Thus, the upper and lower arms 146 and 154 are opened as shown in FIG. 40 by rotating the upper arm 146 clockwise and the lower arm 154 counter-clockwise.

On the contrary, if the CPU core 40 receives an instruction to close the arm (S90), the upper motor 164 is rotated clockwise by the upper driver 160 (S91). Consequently the upper arm 146 is rotated counterclockwise. Next, the lower motor 166 is rotated counterclockwise by the lower driver 162 (S92). Consequently the lower arm 154 is rotated clockwise. Thus, the upper and lower arms 146 and 154 are closed by controlling the upper and lower arms 146 and 154 to approach each other.

Figure 41:
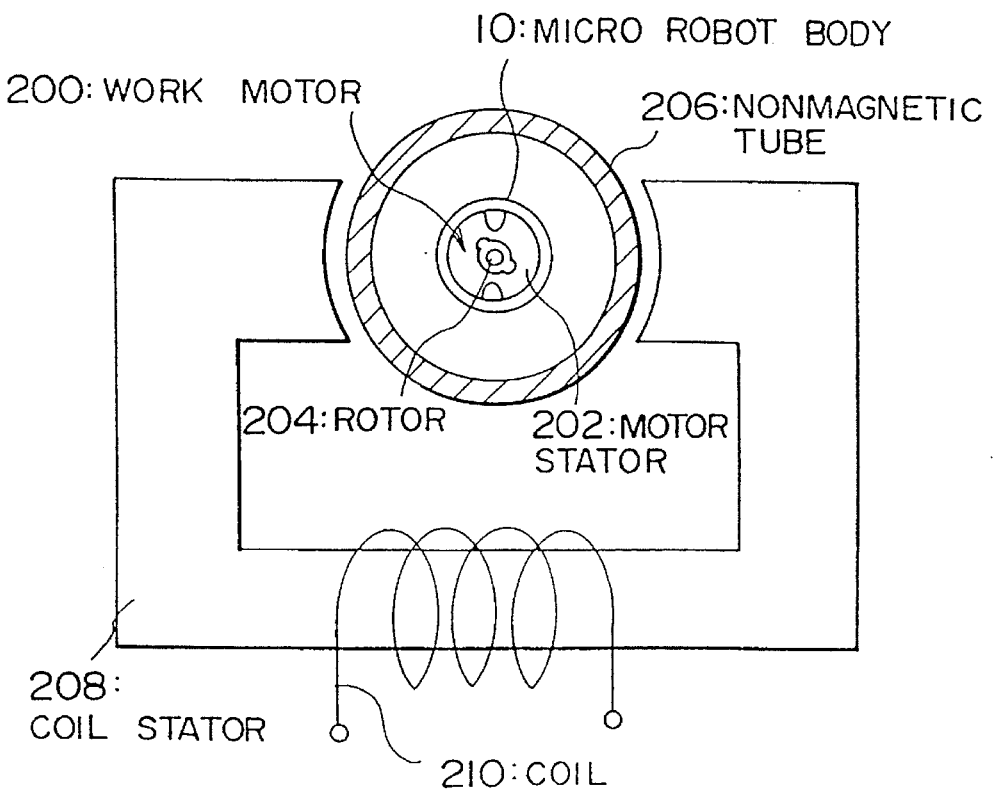
FIG. 41 is a conceptual view of a further embodiment of the micro robot according to the present invention.
Figure 42:
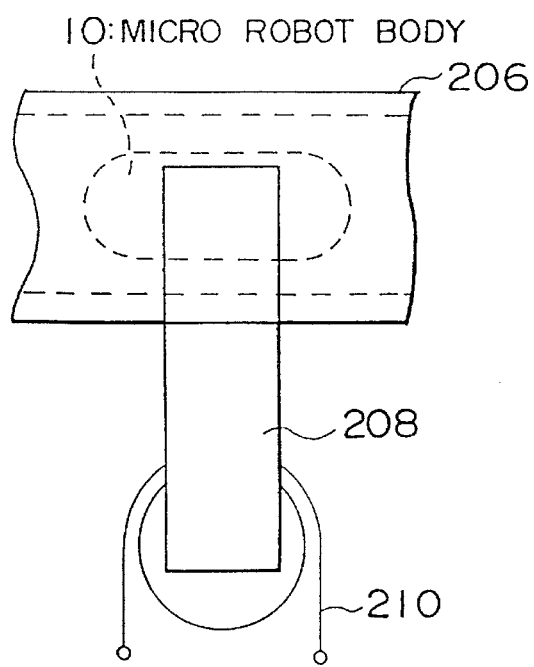
FIG. 42 is a side view of FIG. 41.

FIG. 41 is a conceptual diagram of a micro robot according to another embodiment of the present invention, and FIG. 42 is a side view thereof. A robot body 10 includes a work motor 200 as illustrated, and this work motor 200 is constituted by a motor stator 202 and a rotor 204. This robot body 10 is disposed in a non-magnetic pipe 206, and this non-magnetic pipe 206 is filled with a fluid. A coil stator 208 is disposed outside the non-magnetic pipe 206, and a coil 210 is wound on the coil stator 208.

Figure 43:
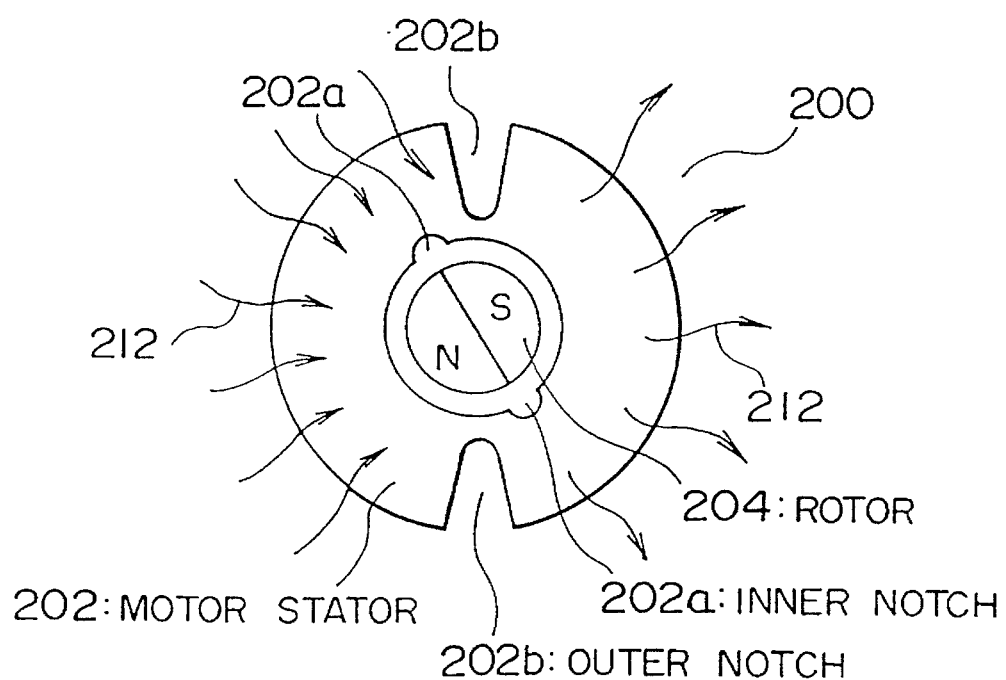
FIG. 43 is a view showing in detail the work motor.

FIG. 43 is a diagram illustrating the details of the work motor 200. A pair of inner notches 202a are provided in the inner circumferential portion of the motor stator 202, and a pair of outer notches 202b are provided in the outer circumferential portion, so that the positions of the inner notches 202a are shifted from the positions of the outer notches 202b in the circumferential direction as illustrated. The rotor 204 is constituted by a magnet, which is magnetized into two poles, N and S poles. If a magnetic field is applied from the outside, a magnetic flux 212 passes through the motor stator 202 as illustrated.

Figure 44:
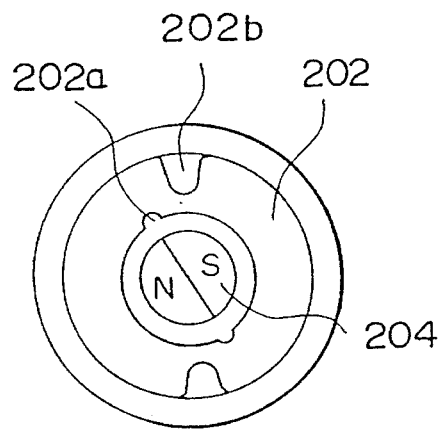
FIGS. 44, 45 and 46 are views showing principle of operation of the work motor.
Figure 45:
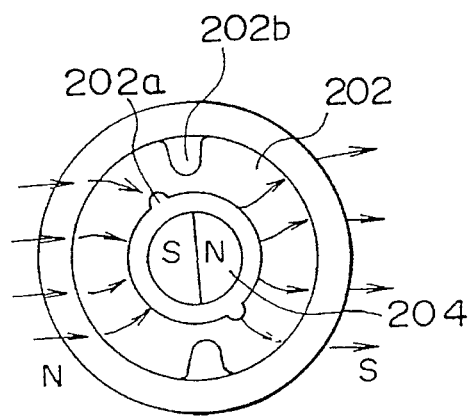
Figure 46:
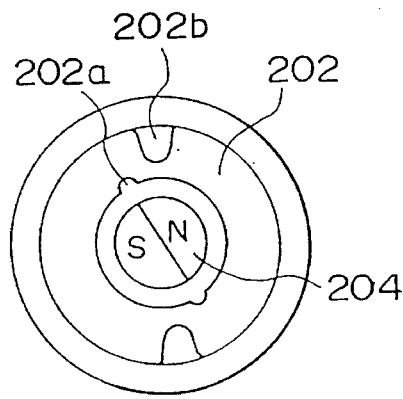

FIGS. 43 through 46 are diagrams illustrating the principle of operation of the work motor 200. FIG. 44 is a diagram illustrating the state in which a magnetic field is not applied from the outside. The boundary points of the N and S poles of the rotor 204 are stable while they are in opposition to the inner notches 202a in this state. Next, if a magnetic field is applied as shown in FIG. 45, the rotor 204 rotates, but the portions of the motor stator 202 corresponding to the outer notches 202b are so narrow to be saturated magnetically if a strong magnetic field is applied, so that the magnetic field in these portions is so weak that the above-mentioned boundary points of the rotor 204 are stabilized in the portions corresponding to the outer notches 202b. If application of the magnetic field from the outside is stopped after that, the above-mentioned boundary points are stabilized while they are in opposition to the inner notches 202a as shown in FIG. 46. It understood that the rotor 204 is thus rotated by half a rotation from FIG. 44 to FIG. 46. Next, the rotor 204 is further rotated by half a rotation if a magnetic field is applied from the opposite direction. The rotor 204 is rotated continuously by thus application of opposite magnetic fields alternately. Although an example of rotating a rotor counterclockwise has been described, it is possible to rotate a rotor clockwise in the same manner. Further, this principle of operation of a motor itself can be applied to the stepping motors 64 and 66 in the above-mentioned embodiments, and so on.

Since the principle of operation of the work motor 200 has been made apparent, next the operation of the apparatus in FIGS. 41 and 42 will be described. If a positive/negative exciting current is fed to the coil 210, a magnetic flux corresponding thereto is generated in the coil stator 208, and the magnetic flux passes through the non-magnetic pipe 206, and reaches to the motor stator 202, so that the rotor 204 is rotated by the above-mentioned principle of operation. With the rotation of the rotor 204, it is possible to function as a micro pump, to rotate a not-shown screw as propulsion, or to make a stream of fluid. Or it is also possible to rotate a not-shown cutter to cut off an aimed portion.

Particularly in this embodiment, if the coil stator 208 is moved in the longitudinal direction of the non-magnetic pipe 206, the work motor 200 itself is moved along the movement of the coil stator 208 by the magnetic force caused by the magnetic field. It is therefore possible to control the position of the micro robot body 10 by applying a magnetic field from the outside. Further it is not necessary to mount the micro robot body 10 with means (accumulator) for storing energy for driving the work motor 200 since the work motor 200 can be driven by applying a magnetic field from the outside. Not one coil stator 208 but a plurality those coil motors may be provided along the longitudinal direction of the non-magnetic pipe 206 to drive a plurality of robot bodies 10 sequentially. Further, it is not necessary to make the coil 210 single-phase, and it may be constituted by a multi-phase coil such as three-phase one or the like. In such a case, the motor stator 202 and so on should be made to have configurations corresponding to the number of phases of the coil.

The stepping motors in the above-mentioned embodiments except for the embodiment of FIG. 41 may be constituted by ultrasonic motors or the like. Further, a micro robot may be constituted by the desired combination of elements in the above-mentioned embodiments correspondingly to necessity.

Next, a charging mechanism for the power source 16 will be described.

Figure 47:
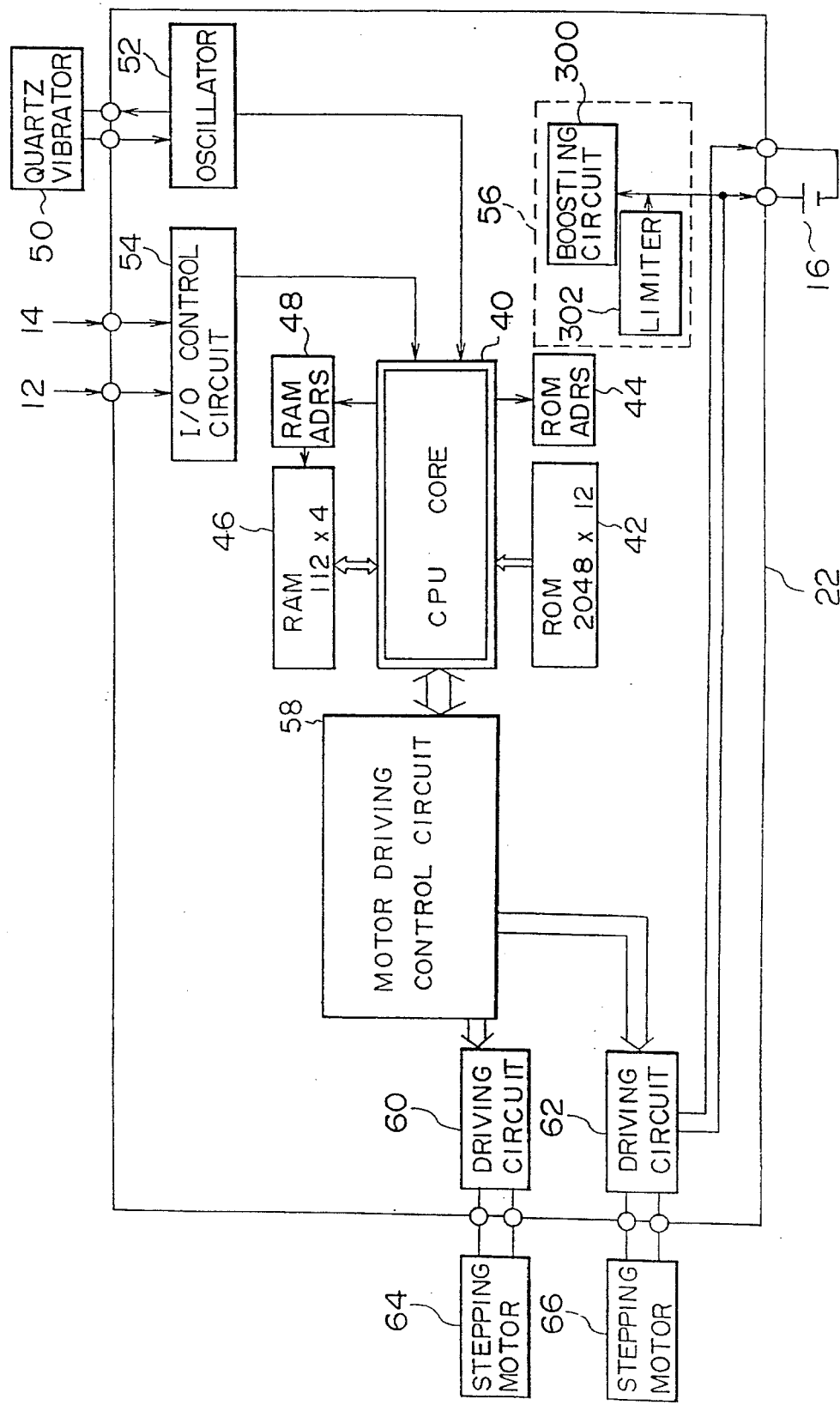
FIG. 47 is a block diagram showing in detail the circuit portion in which a mechanism for performing charging by electromagnetic induction.

FIG. 47 is a block diagram illustrating the details of the circuit portion 22 to which a charging mechanism by electromagnetic induction is added. The output of a charging circuit of a motor driving circuit 62 is connected to a power source portion 16, and a voltage regulator 56 is connected to this power source portion 16. This voltage regulator 56 is constituted by a boosting circuit 300 and a voltage limiter 302.

Figure 48:
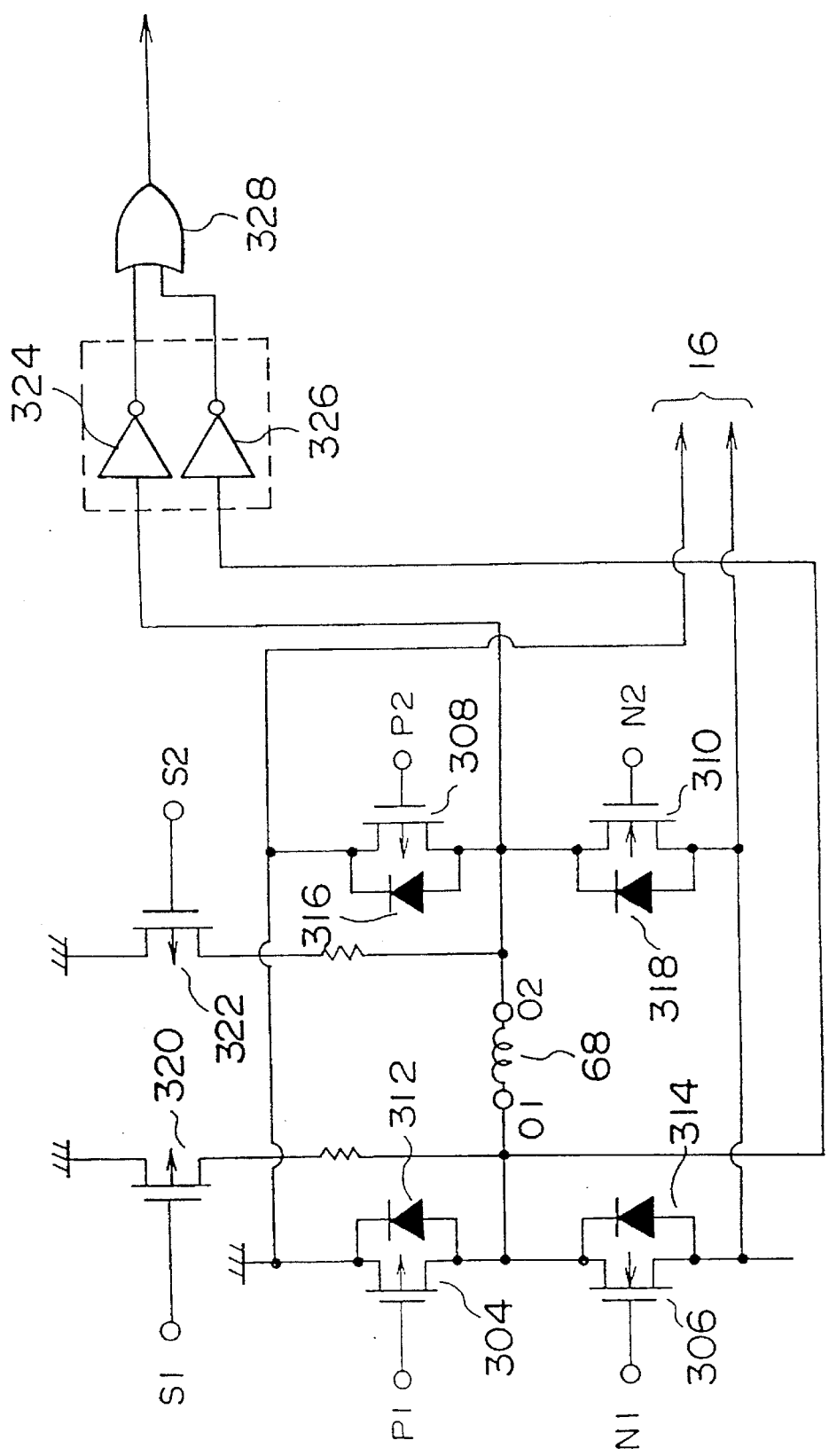
FIG. 48 is a block diagram showing in detail the motor driving circuit of the embodiment of FIG. 47.

FIG. 48 is a circuit diagram illustrating the details of the motor driving circuit in this embodiment. Motor drivers 304, 306, 308 and 310 are H-connected to an exciting coil 68 as shown therein, and diodes 312, 314, 316 and 318 are connected to the respective drivers in parallel and in reverse direction. Further, switches 320 and 322 for detecting an AC magnetic field are connected in the both ends of the exciting coil 68, so that a closed circuit is formed for the exciting coil 68 if these switches 320 and 322 are closed. Further, the both ends of the exciting circuit 68 are led to invertors 324 and 326 for detecting a magnetic field, and the outputs thereof are led to a motor driving control circuit 58 through an OR circuit 328. Stationarily the drivers 304 and 310 and the drivers 308 and 306 are driven alternately to apply an exciting current to the exciting coil 68 to drive a stepping motor 66, but if all the drivers 304, 306, 308 and 310 are turned off at the time of charging operation, and the exciting coil 68 suffers the electromagnetic induction from a charging coil of a charging stand which will be described later, an induced voltage is rectified by the diodes 312, 314, 316 and 318, and led to the power source portion 16 to perform charging operation. The diodes 312, 314, 316 and 318 provided outside the drivers 304, 306, 308 and 310 can be omitted if the drivers 304, 306, 308 and 310 are constituted by FETs as illustrated, so that diodes included therein equivalently have enough functions.

Figure 49:
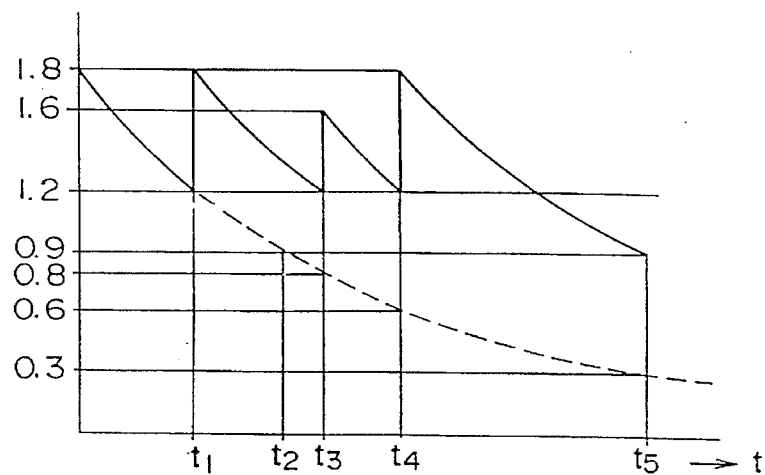
FIG. 49 is a diagram showing discharge characteristic of an electric double layer capacitor constituting the power source portion.
Figure 50:
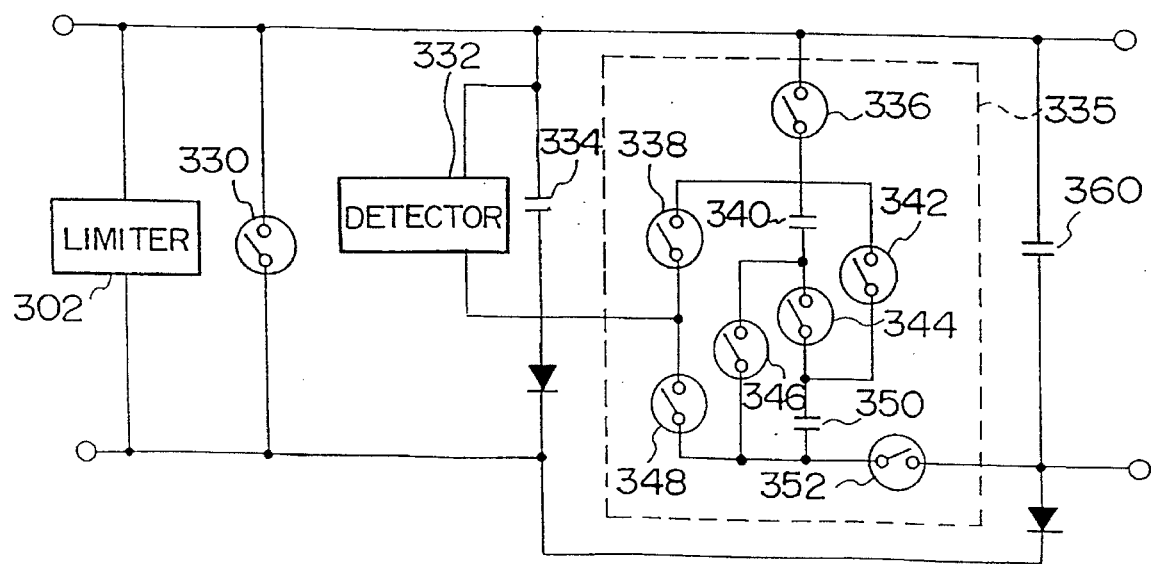
FIG. 50 is a circuit explanatory view showing in detain a voltage regulator.

FIG. 49 is a graph of the discharge characteristic of an electric double layer capacitor 334 constituting the power source portion 16, and FIG. 50 is a circuit explanation diagram illustrating the details of the voltage regulator 56. In FIG. 50, a high capacitance capacitor 334 and a limiter switch 330 are provided, and a capacitor 360 is further included as another power source. Means for charging from the capacitor 334 to the capacitor 360 while boosting the voltage thereof is shown in the portion surrounded by a broken line 335. The means 335 for charging from the capacitor 334 to the capacitor 360 while boosting the voltage is constituted by capacitors 340 and 350, and switches 336, 338, 342, 344, 346, 348 and 352. A source voltage is supplied from the capacitor 360 to the respective portions of the control portion 22. A detector 332 detects the voltage of the capacitor 334.

Next the operation of the circuit of FIG. 50 will be described.

After the large capacitance capacitor 334 is fully charged, the voltages of the capacitors 334 and 360 are the same when the voltage of the capacitor 334 is not lower than 1.2 V. When the voltage of the capacitor 334 is in a range of from 1.2 V to 0.8 V, it is boosted by 1.5 times by the boosting means 335 to charge the capacitor 360. This operation is performed in the period from $t_1$ to $t_3$ in FIG. 49. Therefore, the voltage of the capacitor 360 at this time is in a range of from 1.8 V to 1.2 V. When the voltage of the capacitor 334 is in a range of from 0.8 V to 0.6 V, it is boosted by two times by the boosting means 335 to charge the capacitor 360. This operation is performed in the period from $t_3$ to $t_4$ in FIG. 49. The voltage of the capacitor 360 at this time is in a range of from 1.6 V to 1.2 V.

When the voltage of the capacitor 334 is not higher than 0.6 V, it is boosted by three times by the boosting means 335 to charge the capacitor 360. This operation is performed after $t_4$ in FIG. 49. FIG. 49 shows this state. The voltage illustrated with a solid line is the voltage of the capacitor 360 in FIG. 50, and the voltage illustrated with a broken line is the voltage of the capacitor 334.

Next the operation of the boosting means 335 will be described.

At the time of boosting, charging is first performed from the capacitor 334 to the capacitors 340 and 350, and then the capacitor 360 is charged by the capacitors 334, 340 and 350. That is, the operation shown in FIGS. 51A and 51B through FIGS. 53A and 53B is repeated to boost and charge.

Figure 51A:
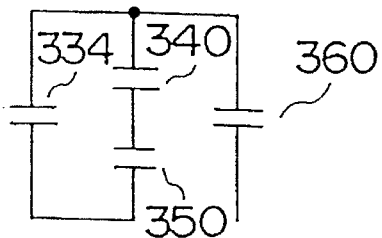
FIGS. 51A and 51B illustrate the boosting circuitry for performing a 1.5 times charge boosting operation.
Figure 51B:
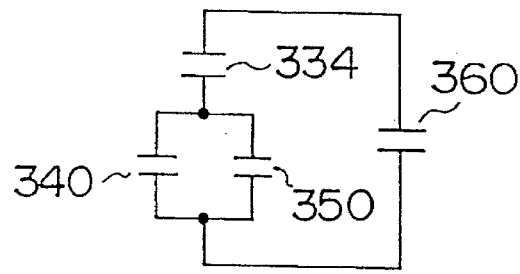
Figure 52A:
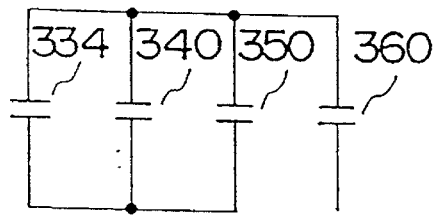
FIGS. 52A and 52B illustrate the boosting circuitry for performing a charge boosting operation of 2.0.
Figure 52B:
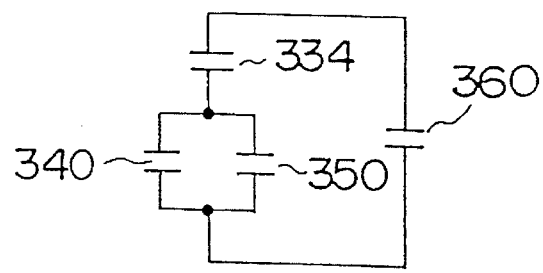

The diagrams of FIGS. 51A and 51B show the case of boosting by 1.5 times;

The diagrams of FIGS. 52A and 52B show the case of boosting by 2 times; and

Figure 53A:
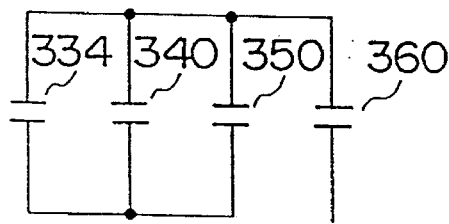
FIGS. 53A and 53B illustrate the boosting circuitry for performing a 3.0 charge boosting operation.
Figure 53B:
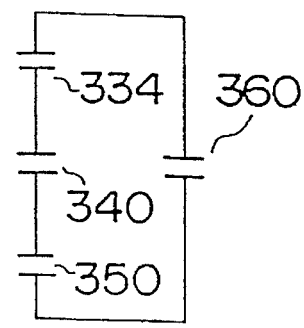

The diagrams of FIGS. 53A and 53B show the case of boosting by 3 times.

Such switching is executed by switching the switches 336, 338, 342, 344, 346, 348 and 352.

As has been described, according to this embodiment, the time possible to operate is expanded from the time $t_2$ to the time $t_5$ in FIG. 49. Further, while the voltage of the capacitor 334 cannot be used in the conventional case if it is not from 0.9 V to 1.8 V, it is possible to use it from 0.3 V to 1.8 V according to this embodiment, so that it is understood that the energy accumulated in the capacitor 334 can be used effectively.

Although the boosting means 335 includes three kinds of boosting means of 1.5 times, 2 times and 3 times in this embodiment, and they are switched through an electric signal by the signal detection portion 332 so as to be used, the present invention is not to be limited to this three kinds, and many variations can be considered, such as providing only one kind or many kinds, or various boosting factors. Further, although voltage detection is performed by detecting the voltage of the capacitor 334 (1.8 V, 1.2 V, 0.8 V, 0.6 V) in this embodiment, not to say, the voltage of the capacitor 360 may be detected (1.8 V, 1.2 V) so that it is compared with the content of the boosting means 335 to decide the boosting state. This method has an advantage that the detection voltage can be reduced.

Figure 54:
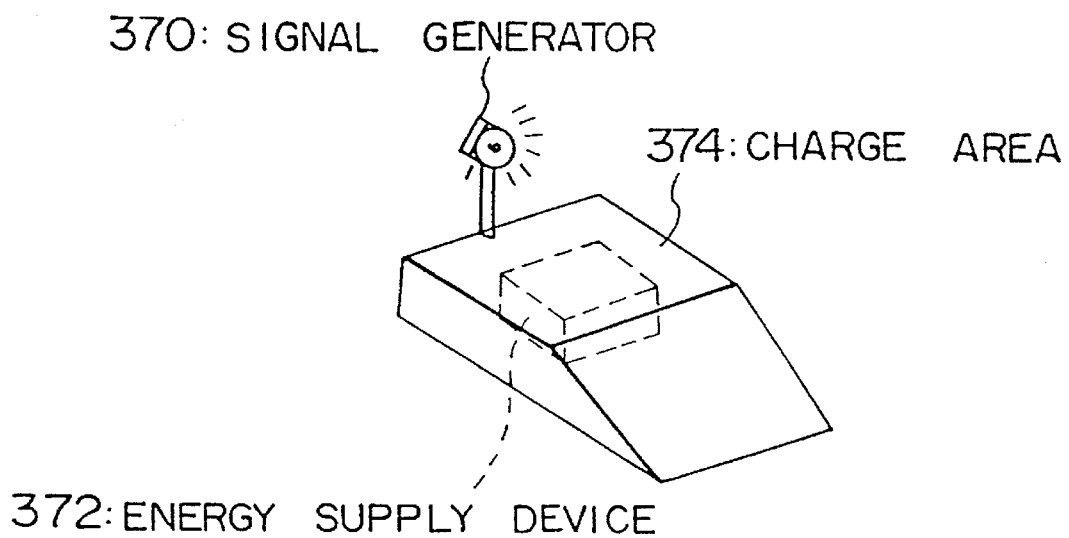
FIG. 54 is a perspective view of a charge stand.

FIG. 54 is a perspective view of a charging stand which is applied to the above-mentioned micro robot. As shown therein, an energy supply device 372 is provided near a signal generator 370 which emits, for example, infrared rays, and a charge area 374 is formed in the upper portion of the energy supply device 372.

Figure 55:
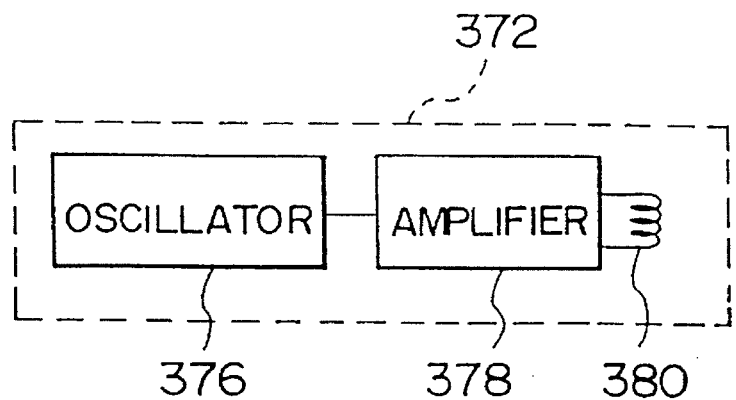
FIG. 55 is a block diagram showing the configuration of an energy supply device.

FIG. 55 is a block diagram illustrating the structure of the energy supply device 372. The output of an oscillator 376 is amplified by an amplifier 378 to excite a charging coil 380. The frequency of the exciting current of this charging coil 380 is established into the frequency higher than the frequency which can be followed by a stepping motor.

Figure 56:
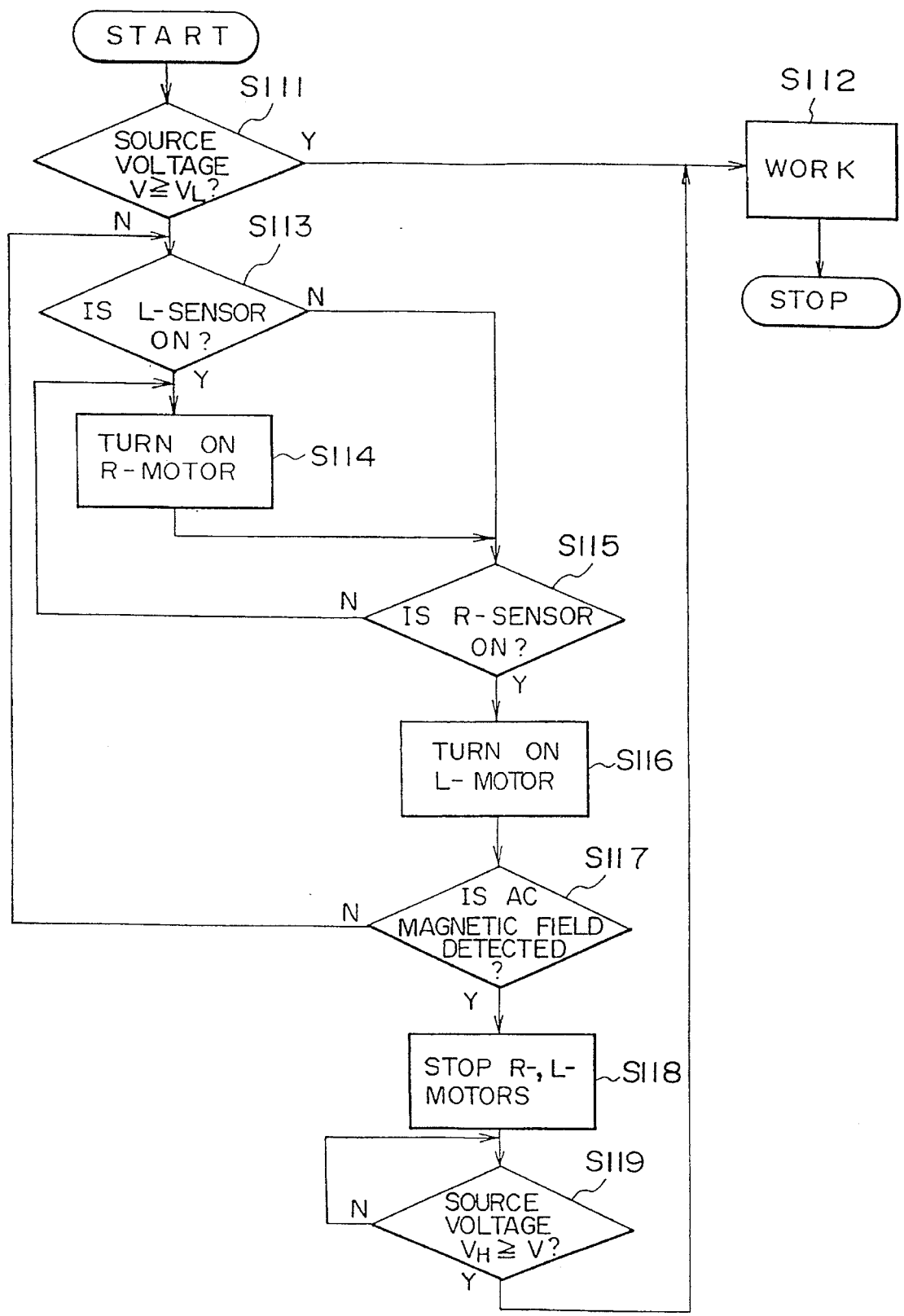
FIG. 56 is a flowchart showing the operation at the time of automatic charging.

FIG. 56 is a flowchart illustrating the operation at the time of automatic charge. The CPU core 40 receives the voltage value of the power source portion 16, judges whether it is higher than a predetermined reference voltage or not (S111), and continues a normal operation if it is higher (S112). If the voltage of the power source portion 16 is lower than the predetermined reference voltage VL, a charge operation is started. First, the robot body 10 is rotated once as it is. For example, if the robot body 10 starts turning to the left, the CPU core 40 judges whether the sensor 12 is in the turned-on state or not (S113), and concludes the signal generator 370 is in the left if the sensor 12 is in the turned-on state, so that the stepping motor 64 is driven (S114). Consequently the wheel 38 is driven to rotate to perform left turning. The CPU core 40 also judges whether the sensor 14 is in the turned-on state or not (S115), and concludes that the signal generator 370 is in the right if the sensor 14 is in the turned-on state, so that the stepping motor 66 is driven (S116). Consequently the wheel 36 is driven to rotate to perform right turning. Each of these sensor 12 and 14 includes two elements: one element is used for guide in response to, for example, normal light, and the other element is used for searching the charge area 374 in response to, for example, only infrared rays from the signal generator 370.

Next, the switches 320 and 322 in FIG. 48 are closed, so that the exciting coil 68 generates an induced voltage in response to a magnetic field generated by the charging coil 380 if the robot body 10 reaches the charge area 374. This induced voltage is supplied to the CPU core 40 through the invertors 324 and 326 and the OR circuit 328, and it is detected therein to detect an AC magnetic field (S117). The robot body 10 is on the charge area 174 when an AC magnetic field is detected, so that driving of the stepping motors 64 and 66 is stopped (S118). The exciting coil 68 generates an induced voltage in response to a magnetic field generated by the charging coil 380, and the induced voltage is rectified by the diodes 312, 318, 316 and 306, and led to the power source portion 16, so that a charging current is supplied to the power source portion 16. Then, the CPU core 40 receives the voltage of the power source portion 16, judges whether the received voltage is higher than a predetermined value VH or not (S119), and moves to a normal operation again if the received voltage becomes higher (S112).

The signal generator 370 of the charging stand may be means for generating ultrasonic waves, magnetism, or the like. In such a case, it is necessary to mount the robot body side with a sensor for detecting it. Further, the robot body 10 may be made to move upon detection of magnetism, light, heat, or the like generated from the energy supply device 372. In such a case, the signal generator 370 is not necessary.

Further, the energy supply device 372 may be operated after the robot body 10 reaches the charge area 374, and it is possible to reduce energy in such a case.

Figure 57:
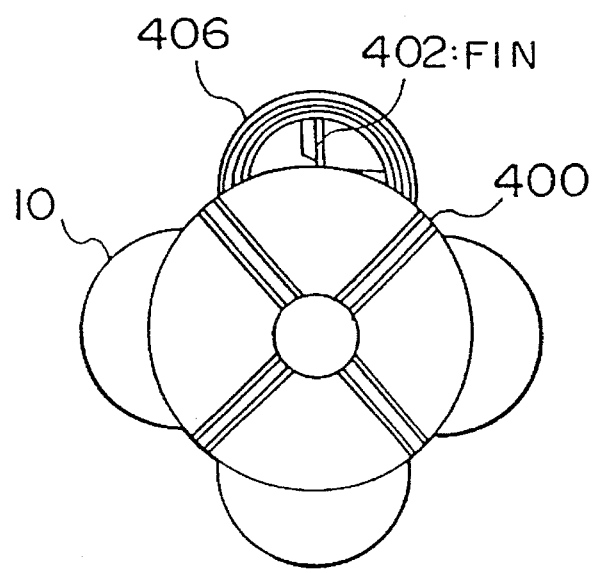
FIG. 57 is a front view of another embodiment of the micro robot according to the present invention.
Figure 58:
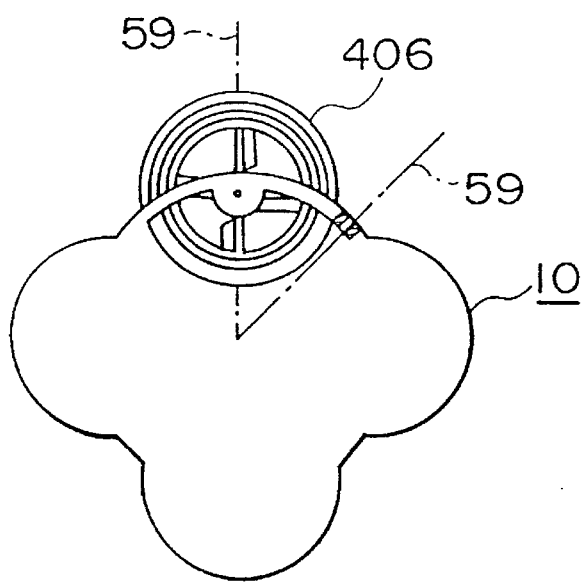
FIG. 58 is a back view of FIG. 57.
Figure 59:
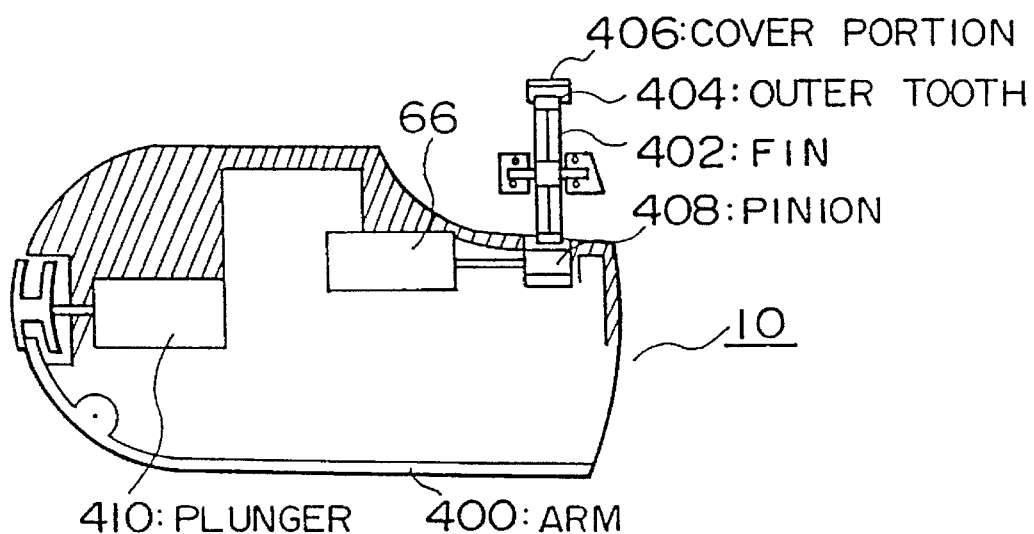
FIG. 59 is a sectional view along 59—59 in FIG. 58.
Figure 60:
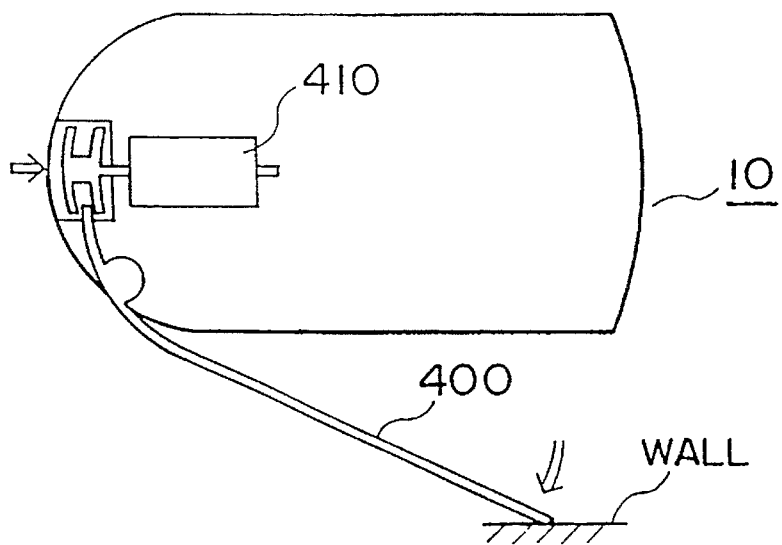
FIG. 60 is a view for explaining the function of the arm of FIG. 57.

FIGS. 57 through 60 are diagrams illustrating a micro robot according to another embodiment of the present invention; FIG. 57 is a diagram viewed from the front; FIG. 58 is a diagram viewed from the back; FIG. 59 is a sectional view taken on line 59—59; and FIG. 60 is a diagram for explaining the function of an arm. The micro robot in this embodiment is not only to obtain a propulsive force by rotating a fin in the fluid flowing in a pipe, but also to generate electricity for charge by use of the flow of the fluid at the time of charge. Four arms 400 are attached to the front portion of a robot body 10, and a fin 402 having outer teeth 404 in its outer circumference portion is attached to the rear portion. Further, the fin 402 is covered with a cover portion 406. The fin 402 is coupled with a stepping motor 66 through a pinion 408. One end portion of the arms 400 is arranged to be driven by a plunger 410, so that the arms 400 are expanded if the plunger 410 is pulled, and the robot body 10 stops in the fluid if the end portion of the arms 400 is pushed on the inner wall of the pipe.

The configuration of a circuit 22 in this embodiment is basically the same as that shown in FIG. 47, providing that the stepping motor 64 in FIG. 47 is replaced by the plunger 410. In a normal operation state, the fin 402 is driven to rotate by the stepping motor 66 so that the robot body 10 advances in the fluid. If the voltage of a power source portion 16 is lower than a predetermined reference value VL, driving of the stepping motor 66 is stopped, and the plunger 410 is pulled to expand the arms 400. Consequently the robot body 10 stops in the fluid. If the fluid flows in the pipe in such a state of stoppage, the fin 402 is rotated to rotate a rotor 70 of the stepping motor 66 so that an induced voltage is generated in an exciting coil 68, rectified in the same manner as in the above-mentioned embodiment, and led to the power source portion 16. Thus, a charging current is supplied to the power source portion 16. If the voltage of the power source portion 16 charged in such a manner becomes not lower than a predetermined reference voltage VH, the plunger 410 is returned to close the arms 400 to release the robot body 10 from the state of stoppage, and so that the stepping motor 66 is driven to make the robot body 10 start advancing again.

Figure 61:
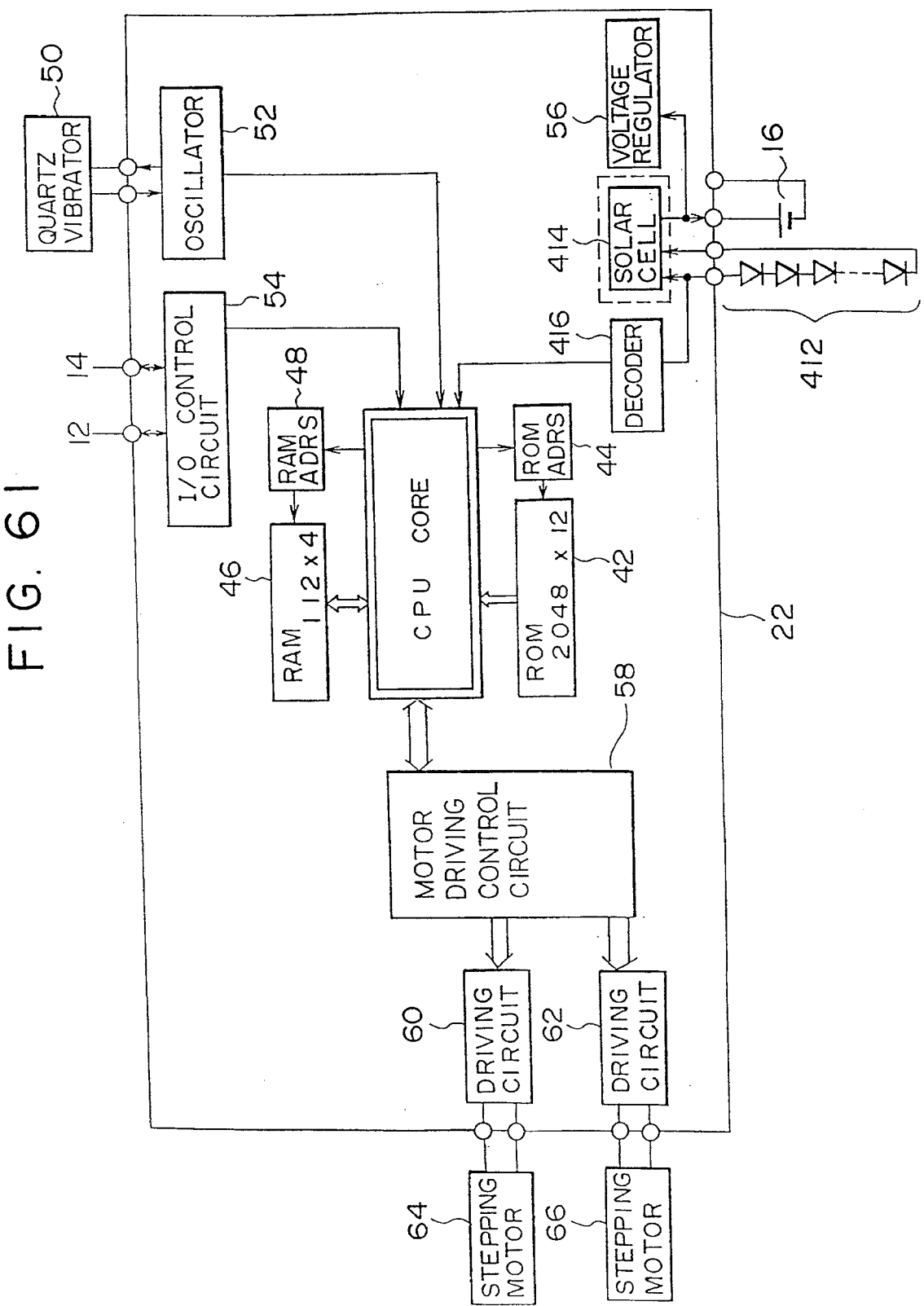
FIG. 61 is a block diagram showing the configuration of the control portion in the case where charging is made by means of a photovoltaic element.

FIG. 61 is a block diagram illustrating the structure of a control portion in the case of charging by means a photo-electromotive element. For example, a solar cell 412 is included as a photo-electromotive element, and the output of this solar cell 412 is supplied not only to the power source portion 16 through a limiter 302 (refer to FIG. 47) of a voltage regulator 56, but also to a CPU core 40 through a decoder 416.

Figure 62:
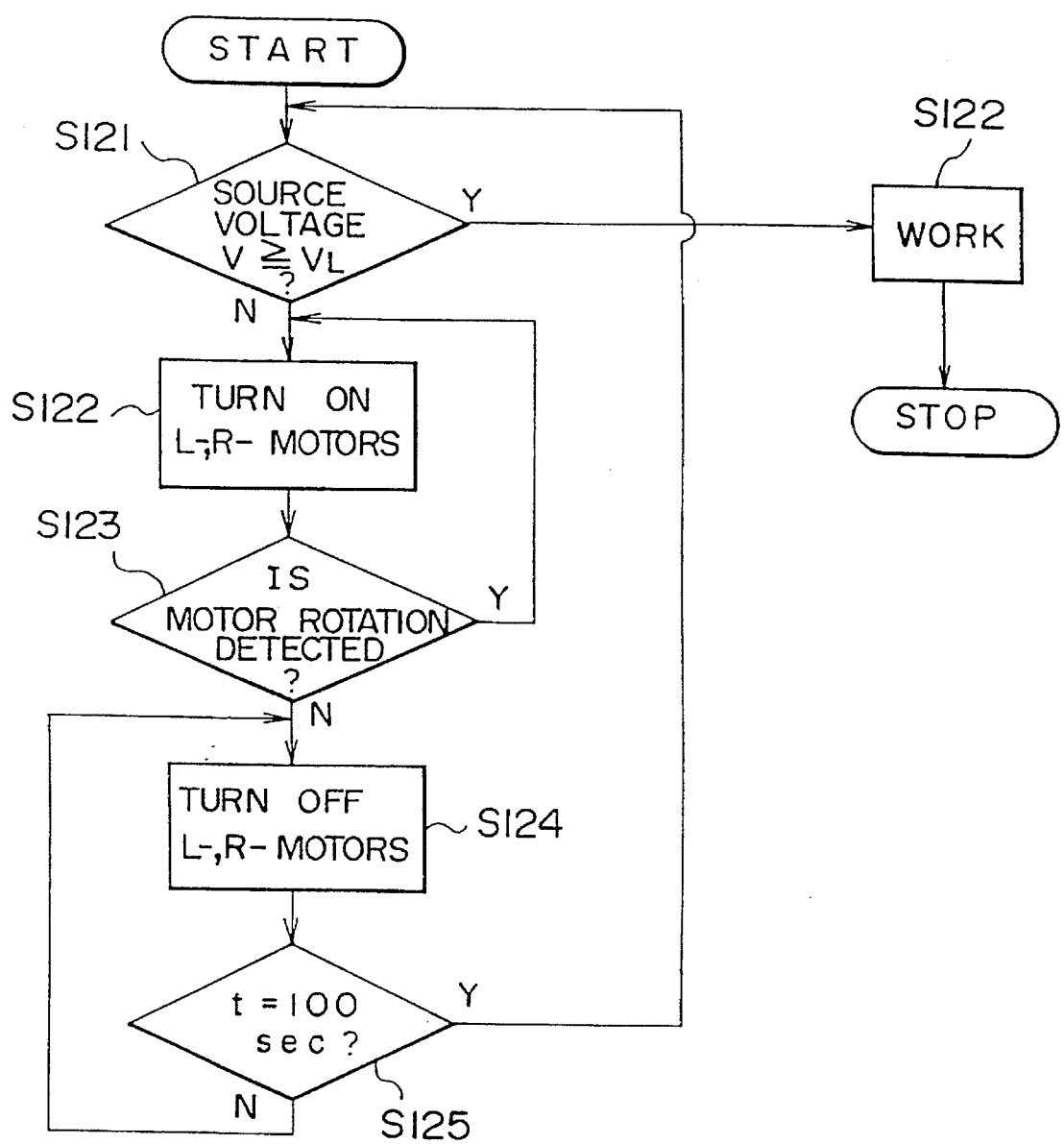
FIG. 62 is a flowchart showing the operation of the embodiment of FIG. 61.

FIG. 62 is a flowchart illustrating the operation of the embodiment of FIG. 61. Charging is performed by the solar cell 412 even at the time of a normal work in this embodiment. If the voltage of the power source portion 16 is lower than a predetermined reference voltage VL (S121), the stepping motors 64 and 66 are driven (S122), and such a state is continued until the rotation of these motors becomes not be detected (S123) and (S124). That is, the stepping motors 64 and 66 are driven until the robot body 10 collides with a wall or the like to thereby put the robot body 10 aside to the corner, and in such a state charging is performed for a certain time, for example, about 100 seconds (S125). If the voltage of the power source portion 16 becomes higher than the predetermined reference voltage VL (S121), a normal work is performed again (S122). In this embodiment, it is not only possible to supply energy from a luminous element on the luminous side by controlling the luminous element, but it is also possible to supply a control signal by superimposing the control signal on the luminous energy. On the side of the robot body 10, the output of the solar cell 212 is analyzed by the decoder 416, and then taken into the CPU core 40.

Although an example by use of the solar cell 412 has been described in the embodiment of FIG. 61, this solar cell may be replaced by a thermoelectric generation element. The thermoelectric generation element is to generate electricity by the difference of temperature, so that the thermoelectric generation element can generate electricity continuously if absorbing heat and producing heat are repeated alternately on the side of energy supply (by driving a heat absorbing/producing element in the charge stand). In such a case, it is necessary to provide a rectifying circuit in the charging circuit 214 since the output of the thermoelectric generation element repeats positive and negative polarities alternately. A rectifying circuit is necessary not only in such a case, but also in the case of providing a charging coil in stead of the solar cell 212 so as to charge the power source portion 16 without using the exciting coil 68.

Figure 63:
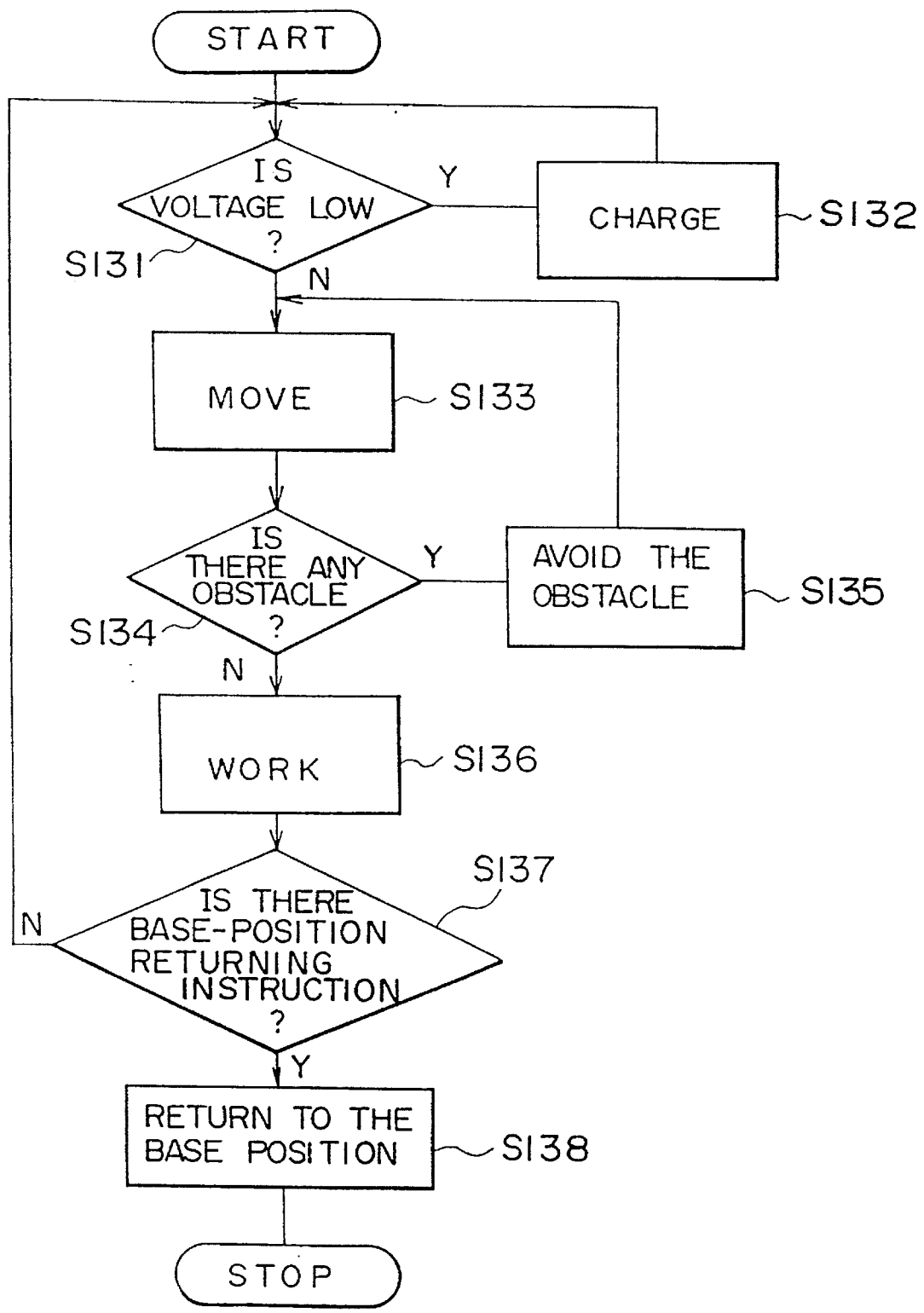
FIG. 63 is a flowchart showing the operation in the case of control in combination of charging, avoiding obstacles, working, and returning to the base portion.

FIG. 63 is a flowchart illustrating the operation in the case of control in combination of charging, avoiding obstacles, working, and returning to the base portion.

The CPU core 40 receives the voltage of the power source portion 16, and judges whether the voltage is higher than the predetermined reference voltage VL or not (S131). If the voltage of the power source portion 16 is lower than the predetermined reference voltage VL, the CPU core 40 brings the micro robot into a charging operation (S132). This charging operation is the same as that in the above-mentioned respective embodiments. If the voltage of the power source portion 16 is higher than the predetermined reference voltage VL, the CPU core 40 moves the micro robot (S133), and judges whether there is an obstacle or not (S134). Detecting an obstacle is performed by detecting with a sensor attached for detecting an obstacle, or by detecting the state in which a stepping motor is not rotating. The detection in the latter is performed as follows. After a driving pulse is supplied to an exciting coil of a stepping motor, an induced voltage becomes large if the stepping motor is rotating while the induced voltage becomes small if the stepping motor is not rotating, so that the judgment can be performed by detecting the degree of the induced voltage.

If it is proved that there is an obstacle (S134), the CPU core 40 brings the micro robot into an avoiding operation. Such an avoiding operation is performed through controls such as stopping, retreating, and so on. If it is proved that there is not any obstacle, the CPU core 40 brings the micro robot into a desired work (advancing and so on) (S136). Next, the CPU core 40 judges whether there is a base-position returning instruction or not (S137), repeats the above-mentioned processing if there is not a base-position returning instruction, and returns the micro robot to the base position if there is a base-position returning instruction (S138). Although work is continued till a base-position returning instruction is given from the outside in this embodiment, the micro robot may return to the base position automatically if work is finished. Returning to the base position is performed in the same manner as moving to the charging stand.

I claim:

1. A micro robot comprising;

at least two sensors having respective detection regions partly overlapping each other;

at least one pair of driving means being driven independently of each other and having driven points separated from each other, each driven point defining a vertical axis extending therefrom in a direction perpendicular to a direction of movement;

a control portion which is composed in a form of a thin plate, for controlling said driving means on the basis of outputs of said sensors;

a chargeable power source portion for supplying a power source voltage to said sensors, said driving means and said control portion, said control portion and said power source portion being arranged in parallel between said pair of driving means, said driving means including an electromagnetic stepping motor having a magnetic rotor, an exciting coil winding wound on a magnetic core, a tabular stator having a circular hole to house said magnetic rotor, a pair of recesses, each being smaller than said magnetic rotor opening into the inside wall of said circular hole at diametrically opposed sites about the center of said circular hole and at a biased angle from a direction of a magnetic flux excited in said circular hole, and a pair of concave portions disposed outside said circular hole; said exciting coil winding being arranged between both ends of said tabular stator, said micro robot further having a center of gravity positioned in approximate alignment with a plane including the vertical axis of said driven points of said pair of driving means and below the highest height among the height of said driving means, said control portion and said power source portion, said microrobot further comprising at least two wheels driven by said driving means, said control portion generating drive pulses for said driving means that are shifted in time with respect to each other.

2. A micro robot comprising;

at least two direction control sensors having respective detection regions partly overlapping each other;

at least one pair of driving means being driven independently of each other and having driven points separated from each other, each driven point defining a vertical axis extending therefrom in a direction perpendicular to a direction of movement;

a work control sensor which receives a work instruction contactlessly from an operation side;

a work driving means;

a control portion for controlling said driving means on the basis of outputs of said direction control sensors and for controlling said work driving means on the basis of an output of said work control sensor; and a chargeable power source portion for supplying a power source voltage to said direction control sensors, said driving means, said work control sensor, said work driving means, and said control portion, said control portion and said power source portion being arranged in parallel between said pair of driving means, said driving means including an electromagnetic stepping motor having a magnetic rotor, an exciting coil winding wound on a magnetic core, a tabular stator having a circular hole to house said magnetic rotor, a pair of recesses, each being smaller than said magnetic rotor opening into the inside wall of said circular hole at diametrically opposed sites about the center of said circular hole and at a biased angle from a direction of a magnetic flux excited in said circular hole, and a pair of concave portions disposed outside said circular hole; said exciting coil winding being arranged between both ends of said tabular stator, said micro robot further having a center of gravity positioned in approximate alignment with a plane including the vertical axis of said driven points of said pair of driving means and below the highest height among the height of said driving means, said control portion and said power source portion, wherein said work driving means includes a micropump which is driven to discharge a fluid.

3. A micro robot comprising:

at least two direction control sensors having respective detection regions partly overlapping each other;

at least one pair of driving means being driven independently of each other and having driven points separated from each other, each driven point defining a vertical axis extending therefrom in a direction perpendicular to a direction of movement;

a work control sensor which receives a work instruction contactlessly from an operation side;

a work driving means;

a control portion for controlling said driving means on the basis of outputs of said direction control sensors and for controlling said work driving means on the basis of an output of said work control sensor; and a chargeable power source portion for supplying a power source voltage to said direction control sensors, said driving means, said work control sensor, said work driving means, and said control portion, wherein said control portion and said power source portion being arranged in parallel between said pair of driving means, said driving means including an electromagnetic stepping motor, said electromagnetic stepping motor comprising; a magnetic rotor, an exciting coil winding wound on a magnetic core, a tabular stator having a circular hole to house said magnetic rotor, a pair of recesses, each being smaller than said magnetic rotor opening into the inside wall of said circular hole at diametrically opposed sites about the center of said circular hole and at a biased angle from a direction of a magnetic flux excited in said circular hole, and a pair of concave portions disposed outside said circular hole; said exciting coil winding being arranged between both ends of said tabular stator, said micro robot further having a center of gravity positioned in approximate alignment with a plane including the vertical axis of said driven points of said pair of driving means and below the highest height among the height of said driving means, said control portion and said power source portion, wherein said work driving means includes a hand mechanism and a driving means for driving said hand mechanism.

4. A micro robot attached to an end portion of an endoscope, comprising:

a photovoltaic element for receiving light through optical fibers and for supplying a power source voltage;

a micro pump for discharging a fluid; and a control portion for analyzing a control signal superimposed on the light obtained through said optical fibers to thereby drive said micro pump.

5. A micro robot comprising:

a robot body including a driving means having a built-in motor for driving a fin to rotate;

an arm adapted to open outward so as to engage with a pipe inner wall;

a contactlessly chargeable power source portion for supplying a power source voltage to said sensor, said driving means and said control portion; and a control portion which stops the driving of said motor and opens said arm so as to stop within a fluid, when the voltage of said power source portion becomes a value not higher than a predetermined reference voltage value;

whereby when said fin is rotated by a flow of said fluid during stoppage, an induced voltage is generated in a winding of said motor so that said power source portion is charged by said induced voltage after rectified.

6. The micro robot according to claim 5, capable of being disposed within a non-magnetic pipe containing a fluid therein; and wherein an exciting device is provided at the outside of said non-magnetic pipe for supplying a stator of said motor with magnetic flux corresponding to the number of poles of said motor.

7. A micro robot according to claim 1, wherein said exciting device is supported so as to be movable in the direction of length of said non-magnetic pipe.

8. A micro robot comprising:

at least two sensors having respective detection regions partly overlapping each other;

at least one pair of driving means being driven independently of each other and having driven points separated from each other, each driven point defining a vertical axis extending therefrom in a direction perpendicular to a direction of movement;

a control portion which is composed in a form of a thin plate, for controlling said driving means on the basis of outputs of said sensors;

a contactlessly chargeable power source portion for supplying a power source voltage to said sensors, said driving means and said control portion;

said control portion and said contactlessly chargeable power source portion being arranged in parallel between said pair of driving means, said driving means including an electromagnetic stepping motor, said electromagnetic stepping motor comprising; a magnetic rotor, an exciting coil winding wound on a magnetic core, a tabular stator having a circular hole to house said magnetic rotor, a pair of recesses, each being smaller than said magnetic rotor opening into the inside wall of said circular hole at diametrically opposed sites about the center of said circular hole and at a biased angle from a direction of a magnetic flux excited in said circular hole, and a pair of concave portions disposed outside said circular hole; said exciting coil winding being arranged between both ends of said tabular stator, said micro robot further having a center of gravity positioned in approximate alignment with a plane including the vertical axis of said driven points of said pair of driving means and below the highest height among the height of said driving means, said control portion and said contactlessly chargeable power source portion.

9. A micro robot according to claim 8, wherein each of said driving means includes a built-in motor so that an induced voltage is generated in a winding of said motor by a magnetic field of an externally provided charging coil, said induced voltage being used after rectified to charge said power source.

10. A micro robot according to claim 8, further comprising a mechanism by which said micro robot automatically moves toward a stand in which said charging coil is provided.

11. A micro robot according to claim 8, wherein a photovoltaic element is connected to said power source portion so that said power source portion is charged by an output of said photovoltaic element.

12. A micro robot according to claim 8, wherein a thermoelectric generation element is connected to said power source portion so as to generate an electric current in response to heat absorption/generation of an externally provided heat absorption/generation body to thereby charge said power source portion.

13. A micro robot according to claim 8, wherein a booster circuit is connected to said power source portion so that said booster circuit performs automatic boosting operation in accordance with a voltage of said power source portion.

\* \* \* \* \*